United States Patent
Kanda et al.

(10) Patent No.: US 9,672,610 B2
(45) Date of Patent: Jun. 6, 2017

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Yamato Kanda, Hino (JP); Makoto Kitamura, Hachioji (JP); Takashi Kono, Tachikawa (JP); Masashi Hirota, Hachioji (JP); Toshiya Kamiyama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 16 days.

(21) Appl. No.: 14/721,570

(22) Filed: May 26, 2015

(65) Prior Publication Data
US 2015/0254826 A1    Sep. 10, 2015

Related U.S. Application Data

(63) Continuation of application No. PCT/JP2013/081083, filed on Nov. 18, 2013.

(30) Foreign Application Priority Data

Nov. 29, 2012 (JP) ................................. 2012-261671

(51) Int. Cl.
*G06K 9/00* (2006.01)
*G06T 7/00* (2017.01)
(Continued)

(52) U.S. Cl.
CPC .............. *G06T 7/00* (2013.01); *G06K 9/4604* (2013.01); *G06K 9/522* (2013.01); *G06K 9/6277* (2013.01);
(Continued)

(58) Field of Classification Search
CPC ..... G06T 7/403; G06T 7/0083; G06T 7/0012; G06T 7/00; G06T 2207/20224;
(Continued)

(56) References Cited

U.S. PATENT DOCUMENTS 8,107,698 B2    1/2012 Kitamura
8,483,432 B2 *  7/2013 Patwardhan .......... G06T 7/0089
                                              382/103
(Continued)

FOREIGN PATENT DOCUMENTS

CN    102376091 A    3/2012
CN    102376092 A    3/2012
(Continued)

OTHER PUBLICATIONS

International Search Report dated Feb. 25, 2014 issued in PCT/JP2013/081083.
(Continued)

*Primary Examiner* — Ali Bayat
(74) *Attorney, Agent, or Firm* — Scully, Scott, Murphy & Presser, P.C.

(57) ABSTRACT

An image processing apparatus processes an image obtained by capturing inside of a lumen of a living body. The image processing apparatus includes: a contour edge region extracting unit configured to extract a contour edge region of an examination target from the image; an examination region setting unit configured to set an examination region in the image so as not to include the contour edge region; and an abnormal structure identifying unit configured to identify whether a microstructure of a surface of the examination target is abnormal, based on texture information of the examination region.

17 Claims, 23 Drawing Sheets

(51) Int. Cl.
  *G06K 9/46* (2006.01)
  *G06K 9/52* (2006.01)
  *G06K 9/62* (2006.01)
  *G06T 7/41* (2017.01)

(52) U.S. Cl.
  CPC .............. *G06T 7/0012* (2013.01); *G06T 7/41* (2017.01); *G06K 2209/053* (2013.01); *G06T 2207/10024* (2013.01); *G06T 2207/10068* (2013.01); *G06T 2207/20021* (2013.01); *G06T 2207/20041* (2013.01); *G06T 2207/30028* (2013.01); *G06T 2207/30092* (2013.01); *G06T 2207/30101* (2013.01)

(58) Field of Classification Search
  CPC . G06T 2207/20116; G06T 2207/10068; G06T 2207/30101; G06T 2207/30028; G06K 9/4604
  USPC ......................................................... 382/128
  See application file for complete search history.

(56) References Cited

U.S. PATENT DOCUMENTS

| | | |
|---|---|---|
| 8,620,042 B2 | 12/2013 | Kitamura et al. |
| 8,620,043 B2 | 12/2013 | Kitamura et al. |
| 8,768,017 B2 | 7/2014 | Kanda |
| 8,811,698 B2 | 8/2014 | Kono et al. |
| 2001/0054695 A1* | 12/2001 | Lienard .................. A61B 6/481 250/368 |
| 2008/0040083 A1* | 2/2008 | Odry ..................... G06T 7/0012 703/2 |
| 2008/0240526 A1* | 10/2008 | Suri ....................... G06T 7/0083 382/128 |
| 2011/0085713 A1* | 4/2011 | Yan ........................ G06T 7/0081 382/128 |
| 2012/0051612 A1 | 3/2012 | Kitamura et al. |
| 2012/0051654 A1 | 3/2012 | Kitamura et al. |

FOREIGN PATENT DOCUMENTS

| | | |
|---|---|---|
| EP | 2 149 330 A1 | 2/2010 |
| EP | 2 383 698 A2 | 11/2011 |
| EP | 2 423 875 A1 | 2/2012 |
| EP | 2 423 876 A1 | 2/2012 |
| JP | H03-105483 A | 5/1991 |
| JP | 2918162 B2 | 7/1999 |
| JP | 2002-165757 A | 6/2002 |
| JP | 2005-192880 A | 7/2005 |
| JP | 2008-278964 A | 11/2008 |
| JP | 2010-113616 A | 5/2010 |
| JP | 2011-232715 A | 11/2011 |
| JP | 2012-045055 A | 3/2012 |
| JP | 2012-045057 A | 3/2012 |

OTHER PUBLICATIONS

English Abstract of JP H02-124131, dated May 11, 1990.
Charisis, V.S. et al., "Capsule Endoscopy Image Analysis Using Texture Information from Various Colour Models", Computer Methods and Programs in Biomedicine, vol. 107, No. 1, Oct. 4, 2011, pp. 61-74.
Extended Supplementary European Search Report dated Aug. 10, 2016 in related European Application No. 13 85 8045.1.

* cited by examiner

IMAGE PROCESSING APPARATUS, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2013/081083 filed on Nov. 18, 2013 which designates the United States, incorporated herein by reference, and which claims the benefit of priority from Japanese Patent Application No. 2012-261671, filed on Nov. 29, 2012, incorporated herein by reference.

BACKGROUND

1. Technical Field

The disclosure relates to an image processing apparatus, an image processing method, and a computer-readable recording medium for identifying abnormalities in a microstructure on a surface of an examination target in an image which is obtained by capturing the inside of a lumen of a living body.

2. Related Art

For image processing performed on an image which is obtained by capturing the inside of a lumen of a living body by a medical observation apparatus such as an endoscope or a capsule endoscope (hereinafter, also referred to as an intraluminal image or simply referred to as an image), for example, Japanese Patent Application Laid-open No. 2005-192880 discloses a technique for detecting, from an image, abnormal parts determined based on the microstructure of a mucosal surface or the form of a blood vessel course. More specifically, in an intraluminal image, an image composed of a G (green) component that includes a relatively large amount of information about a mucosal microstructure and a blood vessel image is extracted. Thereafter, feature data where a pixel value pattern of a mucosal surface is quantified (see, for example, Japanese Patent No. 2918162 and Japanese Patent Application Laid-open No. 2002-165757) is computed. Then, using the feature data and a linear discriminant function which is created in advance based on intraluminal images with normal and abnormal findings, it is discriminated whether a subject (mucous membrane) in the intraluminal image is normal or abnormal. Note that Japanese Patent No. 2918162 discloses shape feature data (an area, a groove width, a perimeter length, the degree of circularity, a branch point, an edge point, a branching rate, etc.) of a region extracted by binarizing an image of a specific spatial frequency component. In addition, Japanese Patent Application Laid-open No. 2002-165757 discloses feature data obtained based on spatial frequency analysis using a Gabor filter, etc.

SUMMARY

In accordance with some embodiments, an image processing apparatus, an image processing method, and a computer-readable recording medium are provided.

In some embodiments, an image processing apparatus for processing an image obtained by capturing inside of a lumen of a living body includes: a contour edge region extracting unit configured to extract a contour edge region of an examination target from the image; an examination region setting unit configured to set an examination region in the image so as not to include the contour edge region; and an abnormal structure identifying unit configured to identify whether a microstructure of a surface of the examination target is abnormal, based on texture information of the examination region.

In some embodiments, an image processing method is executed by an image processing apparatus for processing an image obtained by capturing inside of a lumen of a living body. The method includes: a contour edge region extracting step of extracting a contour edge region of an examination target from the image; an examination region setting step of setting an examination region in the image so as not to include the contour edge region; and an abnormal structure identifying step of identifying whether a microstructure of a surface of the examination target is abnormal, based on texture information of the examination region.

In some embodiments, a non-transitory computer-readable recording medium with an executable program stored thereon, the program instructing an image processing apparatus for processing an image obtained by capturing inside of a lumen of a living body, to execute: a contour edge region extracting step of extracting a contour edge region of an examination target from the image; an examination region setting step of setting an examination region in the image so as not to include the contour edge region; and an abnormal structure identifying step of identifying whether a microstructure of a surface of the examination target is abnormal, based on texture information of the examination region.

The above and other features, advantages and technical and industrial significance of this invention will be better understood by reading the following detailed description of presently preferred embodiments of the invention, when considered in connection with the accompanying drawings.

DETAILED DESCRIPTION

Image processing apparatuses, image processing methods, and image processing programs according to some embodiments of the present invention will be described below with reference to the drawings. The present invention is not limited by these embodiments. The same reference signs are used to designate the same elements throughout the drawings.

In each embodiment described below, as an example, image processing will be described in which an intraluminal image (hereinafter, also simply referred to as an image) of a living body which is captured by an endoscope is a processing target, and abnormalities in a microstructure of a surface of a mucous membrane which is an examination target are identified from the intraluminal image. The intraluminal image is normally a color image having specified pixel levels (e.g., pixel values of 256 tones) for R (red), G (green), and B (blue) wavelength components (color components) at each pixel position.

First Embodiment

Figure 1:
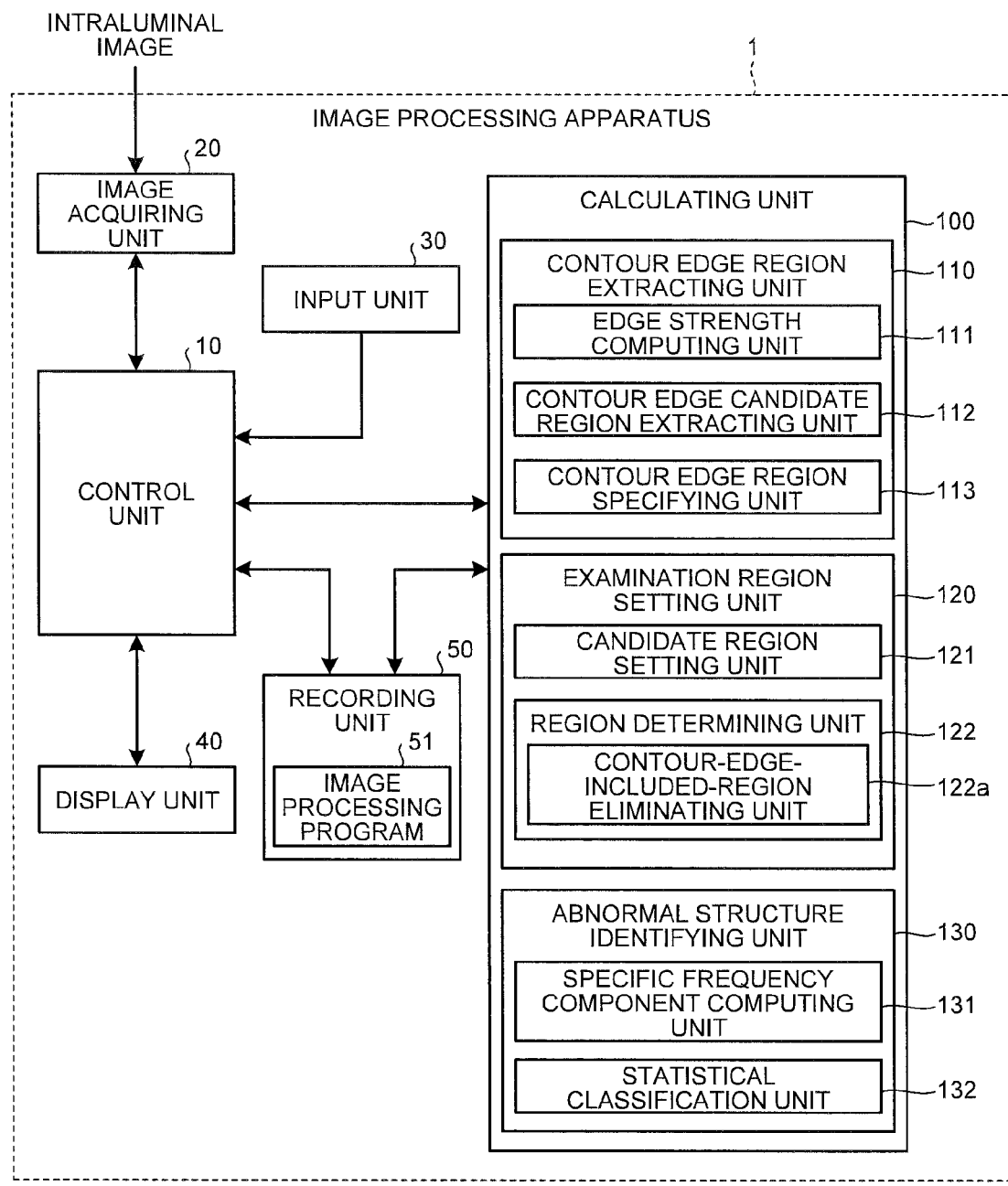
FIG. 1 is a block diagram illustrating a configuration of an image processing apparatus according to a first embodiment of the present invention.

FIG. 1 is a block diagram illustrating an image processing apparatus according to a first embodiment of the present invention. As illustrated in FIG. 1, an image processing apparatus 1 includes a control unit 10 that controls the entire operation of the image processing apparatus 1; an image acquiring unit 20 that acquires image data corresponding to an image captured by an endoscope; an input unit 30 that accepts an input signal which is inputted from an external source; a display unit 40 that performs various types of display; a recording unit 50 that stores image data acquired by the image acquiring unit 20 and various programs; and a calculating unit 100 that performs specified image processing on image data.

The control unit 10 is implemented by hardware such as a CPU, and performs overall control of the entire operation of the image processing apparatus 1 by reading various types of programs recorded in the recording unit 50 to perform instructions, data transfer, etc., to each unit composing the image processing apparatus 1, according to image data inputted from the image acquiring unit 20, an operation signal inputted from the input unit 30, etc.

The image acquiring unit 20 is configured as appropriate, according to the mode of a system including an endoscope. For example, when a portable recording medium is used to pass image data between a capsule endoscope and the image acquiring unit 20, the image acquiring unit 20 is configured by a reader apparatus that causes the recording medium to be removably placed thereinto and reads image data of a recorded image. In addition, when a server that saves image data of images captured by an endoscope is installed, the image acquiring unit 20 is configured by, for example, a communication apparatus connected to the server, and acquires image data by performing data communication with the server. Alternatively, the image acquiring unit 20 may be configured by, for example, an interface apparatus that accepts as input an image signal from an endoscope through a cable.

The input unit 30 is implemented by input devices, e.g., a keyboard, a mouse, a touch panel, and various types of switches, and outputs an accepted input signal to the control unit 10.

The display unit 40 is implemented by a display apparatus such as an LCD or an EL display, and displays various types of screens including an intraluminal image under the control of the control unit 10.

The recording unit 50 is implemented by, for example, various types of IC memories such as a ROM and a RAM, e.g., an updatable and recordable flash memory, a hard disk which is built in or connected via a data communication terminal, or an information recording medium such as a CD-ROM and a reading apparatus for the information recording medium. The recording unit 50 stores, in addition to image data acquired by the image acquiring unit 20, a program for allowing the image processing apparatus 1 to operate and allowing the image processing apparatus 1 to perform various functions, data used during the execution of the program, etc. Specifically, the recording unit 50 stores an image processing program 51 for identifying abnormalities in a microstructure on a mucosal surface in an image, various information used during the execution of the program, etc.

The calculating unit 100 is implemented by hardware such as a CPU, and reads the image processing program 51 and thereby performs image processing on an intraluminal image and performs various calculation processes for identifying abnormalities in a microstructure of a surface of a mucous membrane which is an examination target.

Next, a detailed configuration of the calculating unit 100 will be described. The calculating unit 100 includes a contour edge region extracting unit 110 that extracts mucosal contour edge regions from an image; an examination region setting unit 120 that sets examination regions in the image so as not to include the extracted contour edge regions; and an abnormal structure identifying unit 130 that identifies whether a microstructure of a mucosal surface in the examination regions is abnormal.

Of these units, the contour edge region extracting unit 110 includes an edge strength computing unit 111 that computes an edge strength of each pixel in the image; a contour edge candidate region extracting unit 112 that extracts pixels with an edge strength greater than or equal to a predetermined threshold value, as contour edge candidate regions; and a contour edge region specifying unit 113 that specifies contour edge regions, based on feature data of the contour edge candidate regions. The contour edge region extracting unit 110 eliminates noise from pixels with a high edge strength in the image and then extracts regions with the remaining pixels as contour edge regions.

The examination region setting unit 120 includes a candidate region setting unit 121 that sets examination candidate regions in the image; and an region determining unit 122 that determines examination regions from among the examination candidate regions, based on information about the contour edge regions. The examination region setting unit 120 sets examination regions so as not to include the contour edge regions. More specifically, the region determining unit 122 includes a contour-edge-included-region eliminating unit 122a that eliminates examination candidate regions including contour edge regions among the set examination candidate regions. The region determining unit 122 determines, as examination regions, examination candidate regions that remain without being eliminated by the contour-edge-included-region eliminating unit 122a.

The abnormal structure identifying unit 130 identifies abnormalities in a microstructure of a mucosal surface, based on texture information of the examination regions. Here, texture in image processing refers to repeating luminance patterns (See reference: Computer Graphic Arts Society, "Digital Image Processing", page 192 (texture of a region)). In the first embodiment, as texture feature data in which a feature of texture is quantified, a specific spatial frequency component is used. The specific spatial frequency component will be described later.

The abnormal structure identifying unit 130 includes a specific frequency component computing unit 131 that computes a specific spatial frequency component of an examination region; and a statistical classification unit 132 that performs statistical classification based on the specific spatial frequency component. The abnormal structure identifying unit 130 identifies, using a result of the statistical classification, whether a microstructure on a mucosal surface in the examination region is abnormal.

Figure 2:
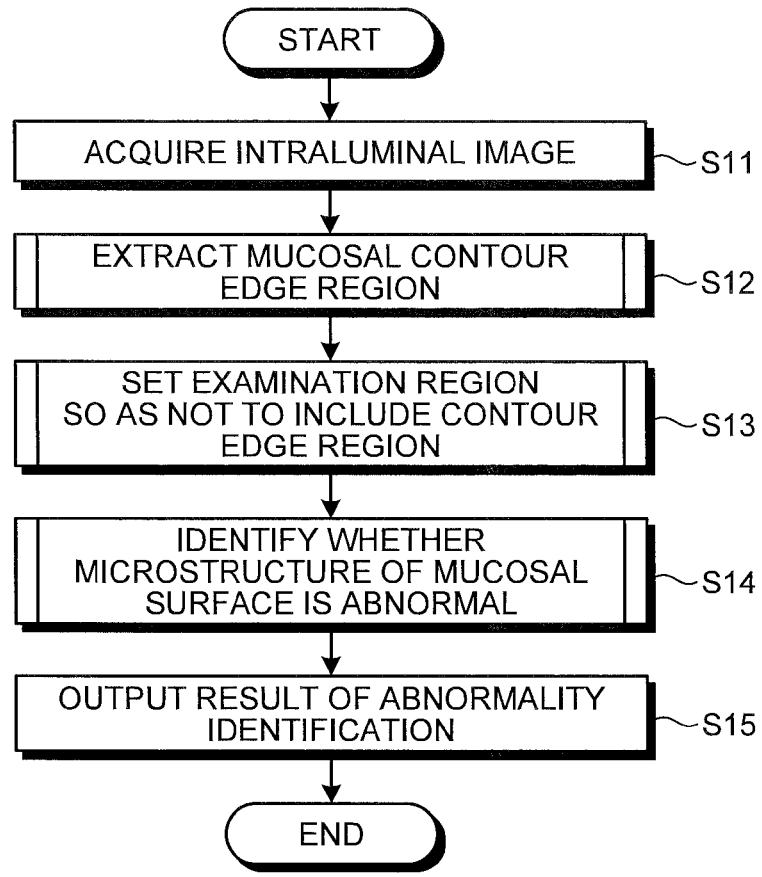
FIG. 2 is a flowchart illustrating the operation of the image processing apparatus illustrated in FIG. 1.

Next, the operation of the image processing apparatus 1 will be described. FIG. 2 is a flowchart illustrating the operation of the image processing apparatus 1.

Figure 3:
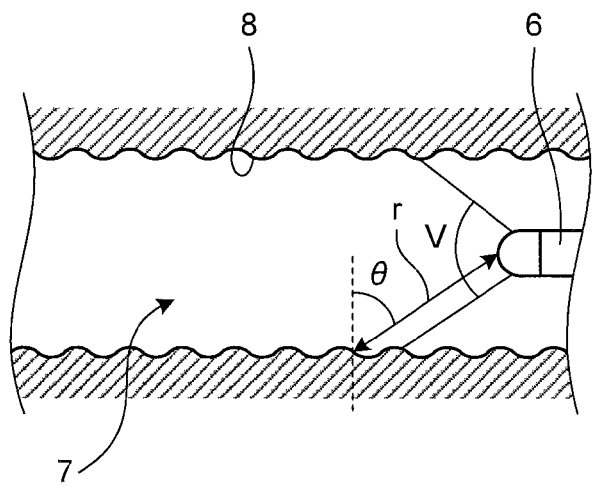
FIG. 3 is a schematic diagram illustrating a state of capturing the inside of a lumen by an endoscope.
Figure 4:
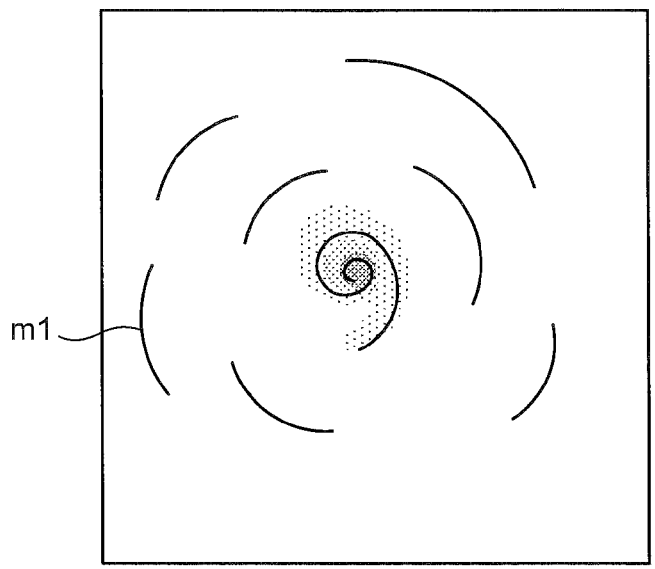
FIG. 4 is a schematic diagram illustrating an intraluminal image captured by the endoscope.

First, at step S11, the calculating unit 100 reads image data recorded in the recording unit 50 and thereby acquires an intraluminal image which is a processing target. Here, FIG. 3 is a schematic diagram illustrating a state of capturing the inside of a lumen by an endoscope. In addition, FIG. 4 is a schematic diagram illustrating an intraluminal image captured by the endoscope. As illustrated in FIG. 3, an endoscope 6 captures an image such that a central axis of a field of view V roughly matches a longitudinal direction of a lumen 7. Hence, in an image M where a surface of a mucous membrane (mucosal surface 8) which is an examination target is displayed, overlapping of mucosal folds may appear as contour edge regions m1.

Figure 5:
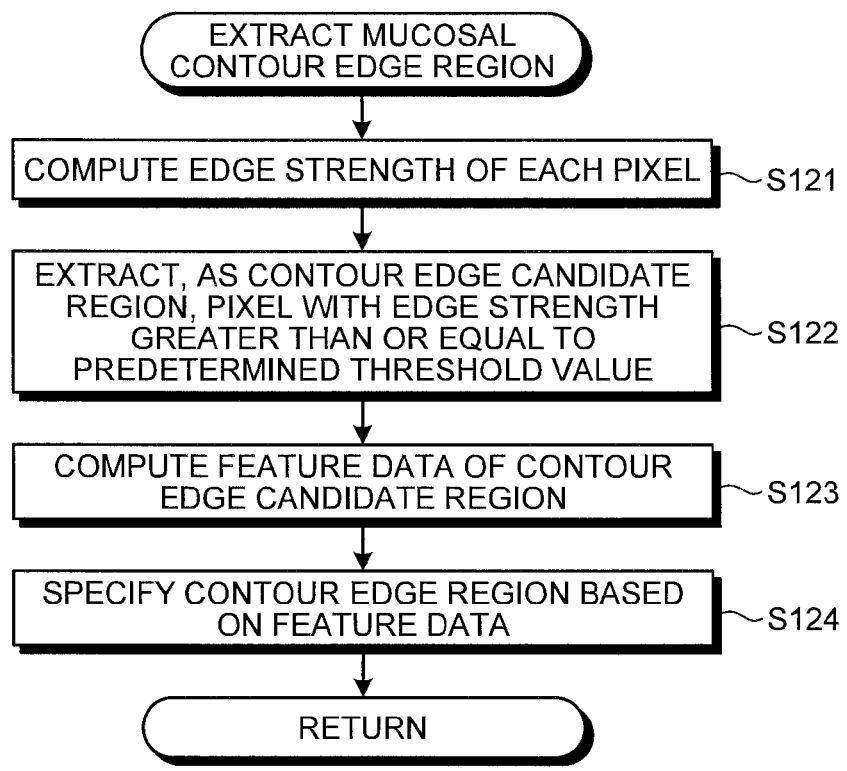
FIG. 5 is a flowchart illustrating details of a process performed by a contour edge region extracting unit illustrated in FIG. 1.

At subsequent step S12, the contour edge region extracting unit 110 extracts mucosal contour edge regions from within the acquired image. FIG. 5 is a flowchart illustrating details of a process performed by the contour edge region extracting unit 110.

First, at step S121, the edge strength computing unit 111 computes an edge strength of each pixel in the image. This can be implemented by using a publicly known derivative filter (See reference: Computer Graphic Arts Society, "Digital Image Processing", page 114 (derivative filter)), a morphological filter (See reference: CORONA PUBLISHING CO., LTD., by KOBATAKE Hidefumi, "Morphology", page 100 (edge detection filter)), or the like, for a wavelength component of any of R, G, and B.

At subsequent step S122, the contour edge candidate region extracting unit 112 extracts pixels with an edge strength greater than or equal to a predetermined threshold value, as contour edge candidate regions (hereinafter, also simply referred to as candidate regions). At this time, the contour edge candidate region extracting unit 112 connects together nearby pixels with an edge strength greater than or equal to the predetermined threshold value, by a publicly known labeling process (See reference: Computer Graphic Arts Society, "Digital Image Processing", page 181 (labeling)) or the like, and thereby recognizes the pixels as a region.

At subsequent step S123, the contour edge region specifying unit 113 computes feature data of the extracted contour edge candidate regions. The feature data includes, for example, a representative value such as an average value or a maximum value of the edge strengths of pixels in a contour edge candidate region and shape feature data such as the area of a contour edge candidate region (i.e., the number of pixels forming the candidate region), a perimeter length (i.e., the amount of movement to track and go around the contour of the candidate region), and a width (see Japanese Patent Application Laid-open No. 2012-11137 disclosed by the inventors of the present application).

Furthermore, at step S124, the contour edge region specifying unit 113 specifies contour edge regions, based on the feature data. More specifically, a candidate region whose representative value of edge strengths which is feature data is less than or equal to a predetermined threshold value, a candidate region with an area or length less than or equal to a predetermined threshold value, a candidate region with a width greater than or equal to a predetermined threshold value, or the like, is eliminated as noise, and the remaining candidate regions are specified as contour edge regions.

Note that at the above-described step S12, as disclosed in Japanese Patent Application Laid-open No. 2012-11137, the process of extracting mucosal roughness, such as mucosal unevenness or mucosal grooves, where a change in pixel value corresponds to a three-dimensional shape of an examination target may be applied.

Thereafter, processing returns to the main routine.

Figure 6:
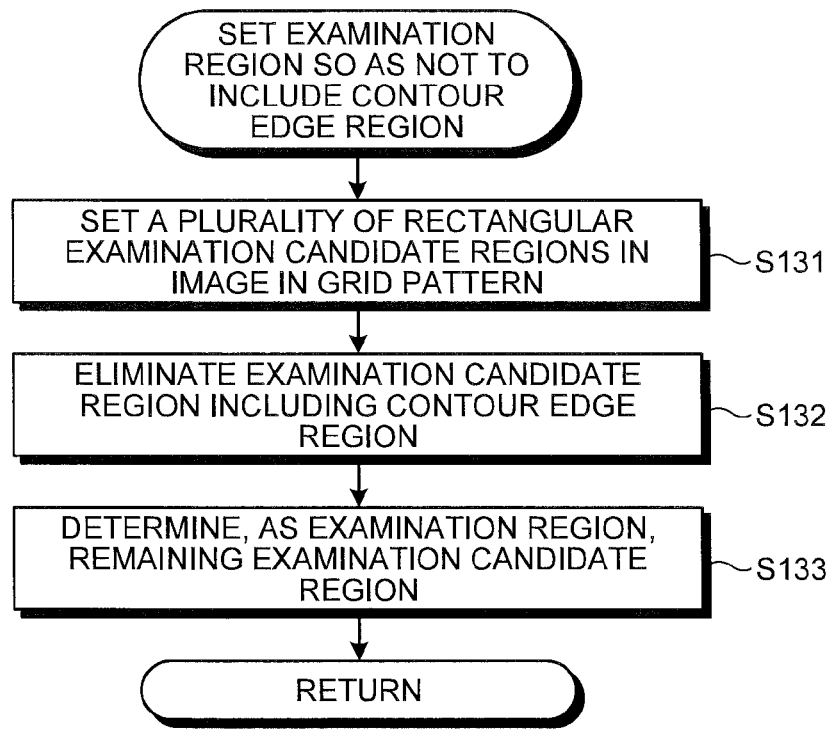
FIG. 6 is a flowchart illustrating a detailed process performed by an examination region setting unit illustrated in FIG. 1.

At step S13 subsequent to step S12, the examination region setting unit 120 sets examination regions so as not to include the contour edge regions. FIG. 6 is a flowchart illustrating a detailed process performed by the examination region setting unit 120. In addition, in the following, as an example, a process performed on the image M illustrated in FIG. 4 will be described.

Figure 7:
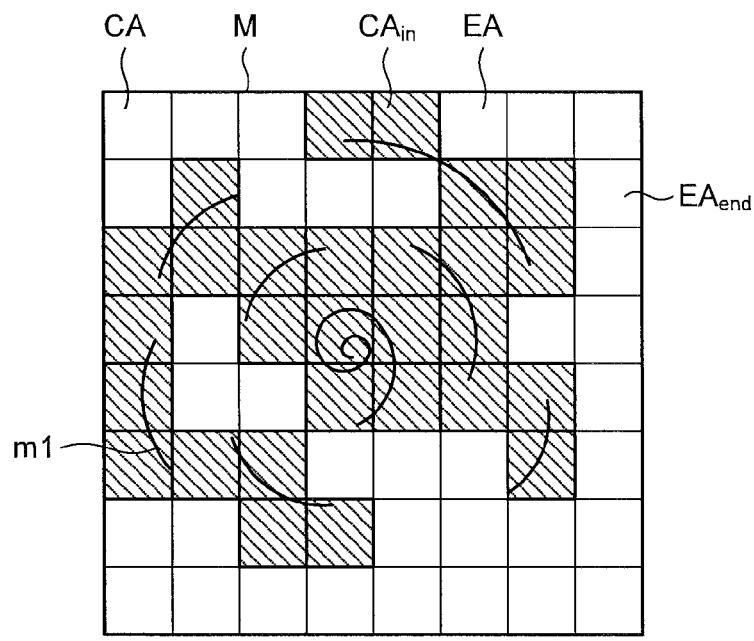
FIG. 7 is a schematic diagram for describing the process performed by the examination region setting unit illustrated in FIG. 1.

First, at step S131, for example, as illustrated in FIG. 7, the candidate region setting unit 121 sets, in the image M, a plurality of rectangular examination candidate regions CA of a specified size in a grid pattern.

At subsequent step S132, the contour-edge-included-region eliminating unit 122a eliminates those of the examination candidate regions CA that include contour edge regions m1. For example, in the case of FIG. 7, examination candidate regions $CA_{in}$ indicated by oblique lines are eliminated as regions including the contour edge regions m1.

Furthermore, at step S133, the region determining unit 122 determines, as examination regions EA, examination candidate regions CA that remain without being eliminated at step S132.

Thereafter, processing returns to the main routine.

Figure 8:
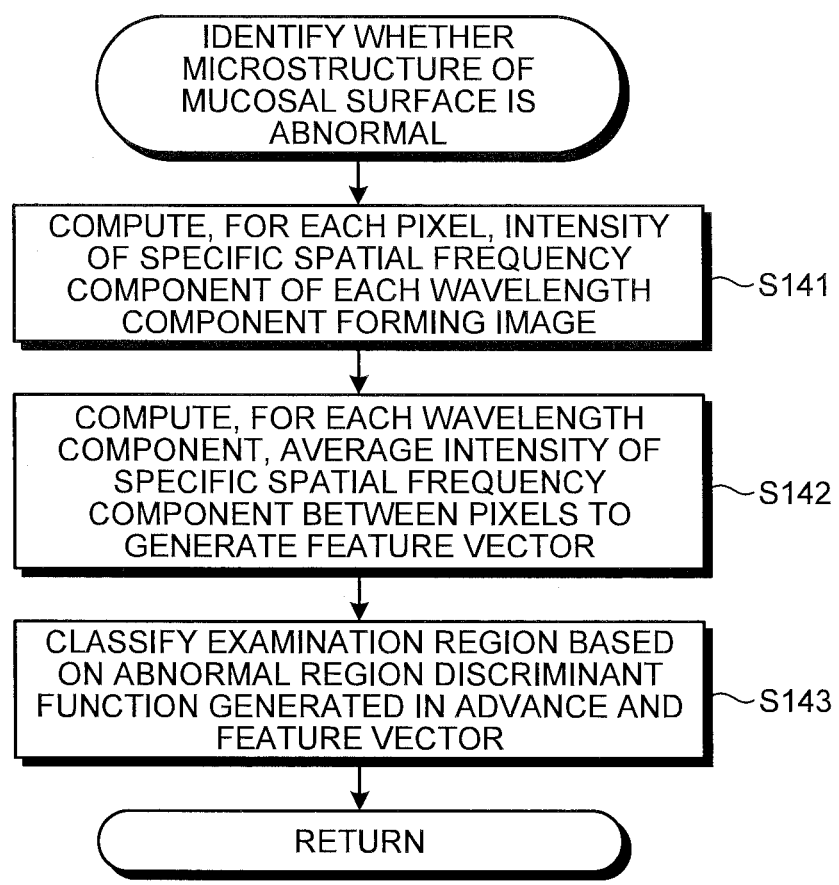
FIG. 8 is a flowchart illustrating details of a process performed by an abnormal structure identifying unit illustrated in FIG. 1.

At step S14 subsequent to step S13, the abnormal structure identifying unit 130 identifies whether a microstructure on a mucosal surface in the image M is abnormal. FIG. 8 is a flowchart illustrating details of a process performed by the abnormal structure identifying unit 130.

First, at step S141, the specific frequency component computing unit 131 computes, for each of wavelength components (an R component, a G component, and a B component) forming the image M, an intensity of a specific spatial frequency component in each examination region EA. As used herein, the specific spatial frequency component refers to a spatial frequency component that can identify whether there is an abnormality in the microstructure on the mucosal surface in the image M, and is set in advance based on teacher data, etc.

The computation of a specific spatial frequency component is implemented by applying a publicly known band-pass filter (See reference: Computer Graphic Arts Society, "Digital Image Processing", page 136 (band-pass filter), page 141 (LOG filter)) to each wavelength component in the examination region EA. Note that in the first embodiment a band-pass filtering process (computation of a specific spatial frequency component) is not performed on pixels located at the edges of the examination region EA (edge pixels) for the following reason. Specifically, when a specific spatial frequency component of an edge pixel in the examination region EA is computed, a pixel outside the examination region EA needs to be used. When the examination region EA is located at an edge of the image M, e.g., an examination region $EA_{end}$, the outside of the examination region EA is, namely, the outside of the image M and thus there may be no pixels. In addition, even when there is a pixel outside the examination region EA, there is a possibility that the pixel value of a pixel inside the examination region EA greatly differs from that outside the examination region EA.

At subsequent step S142, the statistical classification unit 132 computes, for each wavelength component and for the examination region EA, an average intensity of the specific spatial frequency component between pixels, to generate a feature vector x including the average intensities as its components. Note that since in the first embodiment the calculation is performed for three wavelength components, R, G, and B, the feature vector x is a matrix with three rows and one column including the three components.

Here, when the microstructure of the mucosal surface is abnormal, the intensity of a specific spatial frequency component in an intermediate frequency band where a low-frequency component representing the shape of the mucosal surface and a high-frequency component representing imaging noise are removed differs from that for when the microstructure is normal.

Hence, at step S143, the abnormal structure identifying unit 130 performs classification as to whether each examination region EA is abnormal, based on an abnormal region discriminant function generated in advance and the feature vector x generated from the specific spatial frequency component. For the actual process, a classification index P(x) based on a probabilistic model which is shown in the following equation (1) is computed, and when this value is greater than or equal to a threshold value, the examination region EA is classified as "abnormal".

$$P(x) = \frac{1}{(2\pi)^{k/2} \times |Z|^{1/2}} \exp\left\{(x-\mu)^t \times \left(-\frac{1}{2}\right)^{Z-1} \times (x-\mu)\right\} \quad (1)$$

In equation (1), the symbol "μ" is the average vector (three rows and one column) of feature vectors of a plurality of abnormal region samples which are acquired in advance. The symbol "Z" is the variance-covariance matrix (three rows and three columns) of the feature vectors of the plurality of abnormal region samples which are acquired in advance. The symbol "|Z|" is the determinant of the variance-covariance matrix. The symbol "$Z^{-1}$" is the inverse matrix of the variance-covariance matrix. The symbol "k" is the number of dimensions in the feature vector x. In the first embodiment, k=3.

Note that although the first embodiment shows an abnormal region classification method using a probabilistic model, methods other than that described above may be used as long as classification as to whether the examination regions EA are normal or abnormal can be performed. For example, classification may be performed by a method based on a feature space distance with a representative feature vector, a method of setting a classification boundary in feature space, or the like.

Thereafter, processing returns to the main routine.

At step S15 subsequent to step S14, the calculating unit 100 outputs a result of the abnormality identification obtained at step S14 and causes the display unit 40 to display the result, and causes the recording unit 50 to record the result. Thereafter, the process performed by the image processing apparatus 1 ends.

As described above, according to the first embodiment, examination regions are set so as not to include contour edge regions of a mucous membrane which is an examination target, and whether a microstructure is abnormal is identified for the set examination regions. Thus, even when mucosal contour edges are present in an image, abnormalities in the microstructure of a mucosal surface can be accurately identified.

Modified Example 1-1

Next, a modified example 1-1 of the first embodiment of the present invention will be described.

Although the above-described first embodiment shows an example in which a spatial frequency component is used as texture information of a mucosal surface, instead of the spatial frequency component, publicly known texture information may be used, such as statistical feature data using a co-occurrence matrix, a Local Binary Pattern, a higher-order local autocorrelation, a scale-invariant feature transform (SIFT), or histograms of oriented gradients (HOG).

Modified Example 1-2

Next, a modified example 1-2 of the first embodiment of the present invention will be described.

Figure 9:
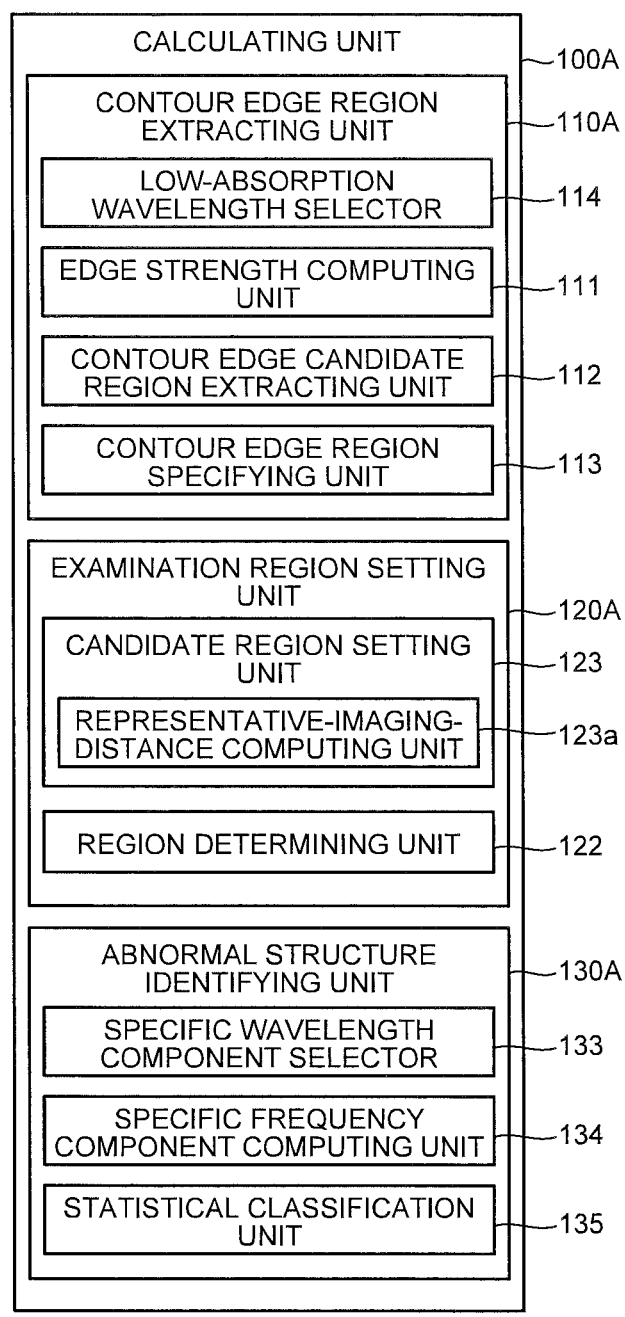
FIG. 9 is a block diagram illustrating a configuration of a calculating unit included in an image processing apparatus according to a modified example 1-2 of the first embodiment of the present invention.

FIG. 9 is a block diagram illustrating a configuration of a calculating unit included in an image processing apparatus according to the modified example 1-2. A calculating unit 100A illustrated in FIG. 9 includes a contour edge region extracting unit 110A, an examination region setting unit 120A, and an abnormal structure identifying unit 130A. Note that the configuration and operation of the image processing apparatus other than the calculating unit 100A are the same as those of the first embodiment (see FIG. 1).

The contour edge region extracting unit 110A further includes a low-absorption wavelength selector 114, compared to the contour edge region extracting unit 110 illustrated in FIG. 1. The low-absorption wavelength selector 114 selects a wavelength component with the lowest degree of absorption or scattering in a living body (low-absorption wavelength component) among a plurality of wavelength components forming an image. The contour edge region extracting unit 110A extracts contour edge regions from within the image, based on the value of the selected low-absorption wavelength component.

The examination region setting unit 120A includes a candidate region setting unit 123 instead of the candidate region setting unit 121 included in the examination region setting unit 120 illustrated in FIG. 1. The candidate region setting unit 123 includes a representative-imaging-distance computing unit 123a that computes a representative imaging distance to an examination target at a position where an examination candidate region is set. The candidate region setting unit 123 sets, in the image, an examination candidate region having a size according to the computed representative imaging distance.

The abnormal structure identifying unit 130A includes a specific wavelength component selector 133 that selects a specific wavelength component which is specified according to the degree of absorption or scattering in a living body; a specific frequency component computing unit 134 that computes a specific spatial frequency component for the selected specific wavelength component; and a statistical classification unit 135 that performs statistical classification based on the specific spatial frequency component. The abnormal structure identifying unit 130A identifies abnormalities in microstructure in examination regions, based on a result of the classification performed based on the specific spatial frequency component for the specific wavelength component.

Next, the operation of the calculating unit 100A will be described. The operation of the calculating unit 100A as a whole is similar to that illustrated in FIG. 2. Details of processes performed by each of the contour edge region extracting unit 110A (step S12), the examination region setting unit 120A (step S13), and the abnormal structure identifying unit 130A (step S14) differ from those of the first embodiment.

Figure 10:
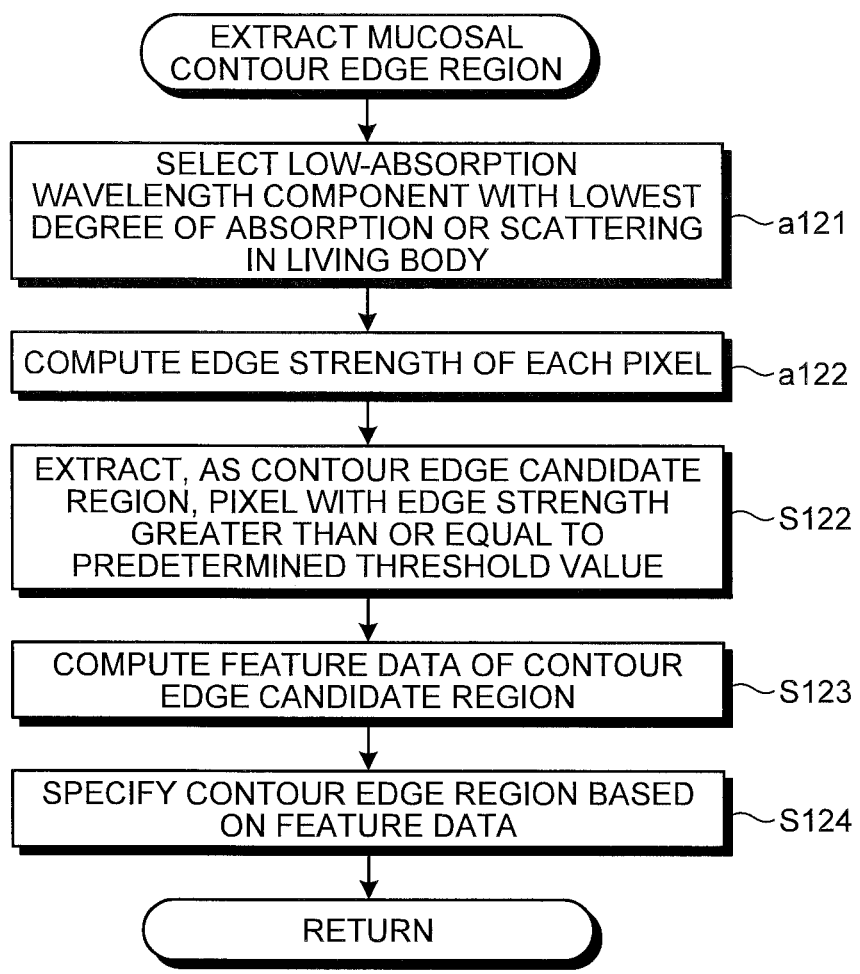
FIG. 10 is a flowchart illustrating a process performed by a contour edge region extracting unit illustrated in FIG. 9.

FIG. 10 is a flowchart illustrating a process performed at step S12 by the contour edge region extracting unit 110A.

First, at step a121, the low-absorption wavelength selector 114 selects an R component as a low-absorption wavelength component. This is done to suppress the influence of absorption or scattering by blood vessels, etc., so that edges of blood vessels of a mucosal surface, etc., are not erroneously discriminated as contour edges, and obtain pixel values at which the imaging distance to the mucosal surface is most favorably reflected. In an image including an R component, a G component, and a B component, the R component is farthest from a blood absorption band and is the longest wavelength component and thus is less likely to be influenced by absorption or scattering in a living body. Therefore, in the modified example 1-2, the R component is selected.

At subsequent step a122, the edge strength computing unit 111 computes an edge strength of each pixel in the image, based on the value of the wavelength component selected at step a121.

Subsequent processes at steps S122 to S124 are the same as those of the first embodiment (see FIG. 5).

Figure 11:
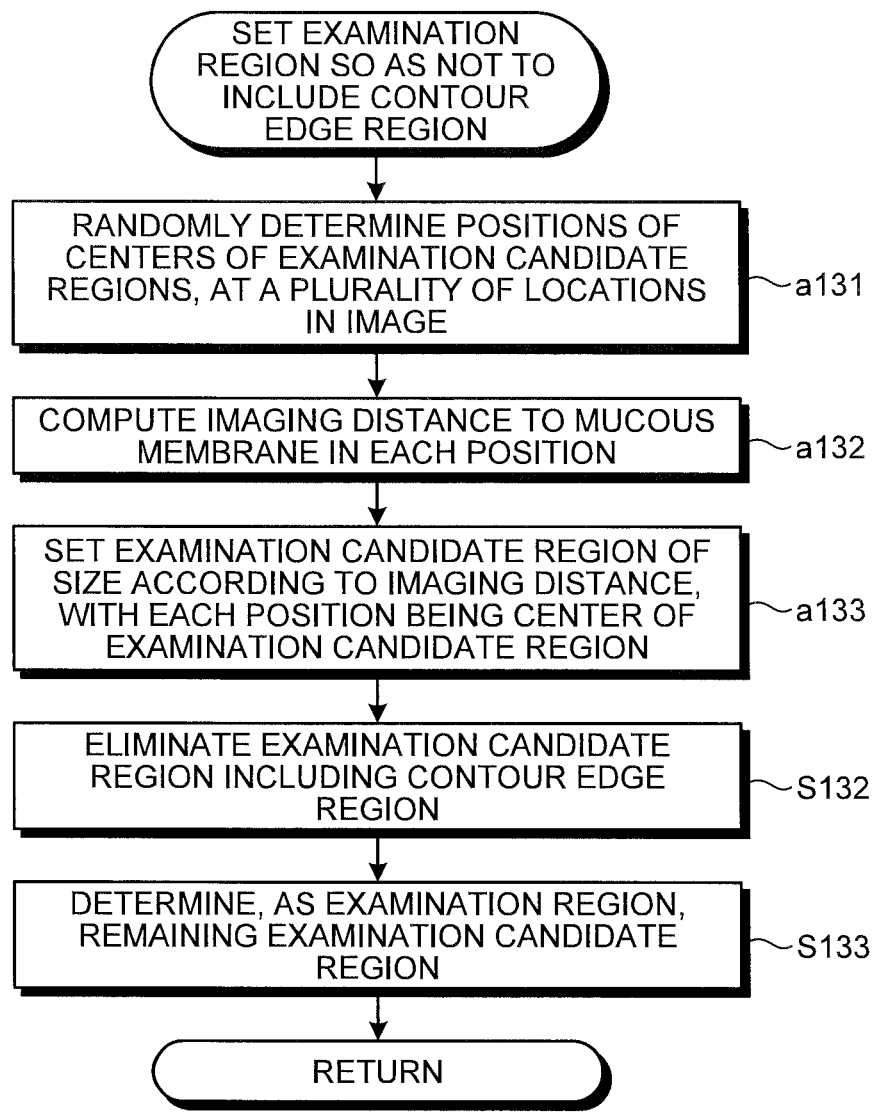
FIG. 11 is a flowchart illustrating a process performed by an examination region setting unit illustrated in FIG. 9.

FIG. 11 is a flowchart illustrating a process performed at step S13 by the examination region setting unit 120A. In addition, FIGS. 12 and 13 are schematic diagrams for describing the process performed by the examination region setting unit 120A.

Figure 12:
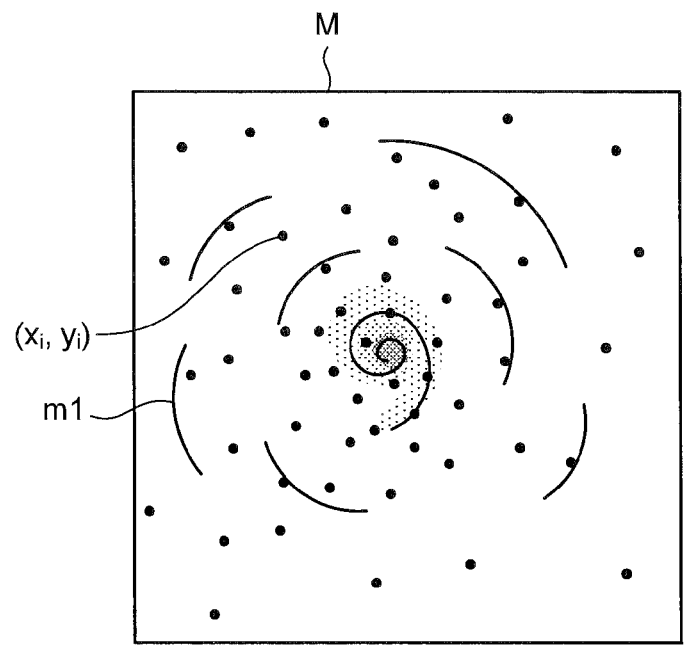
FIG. 12 is a schematic diagram for describing the process performed by the examination region setting unit illustrated in FIG. 9.
Figure 13:
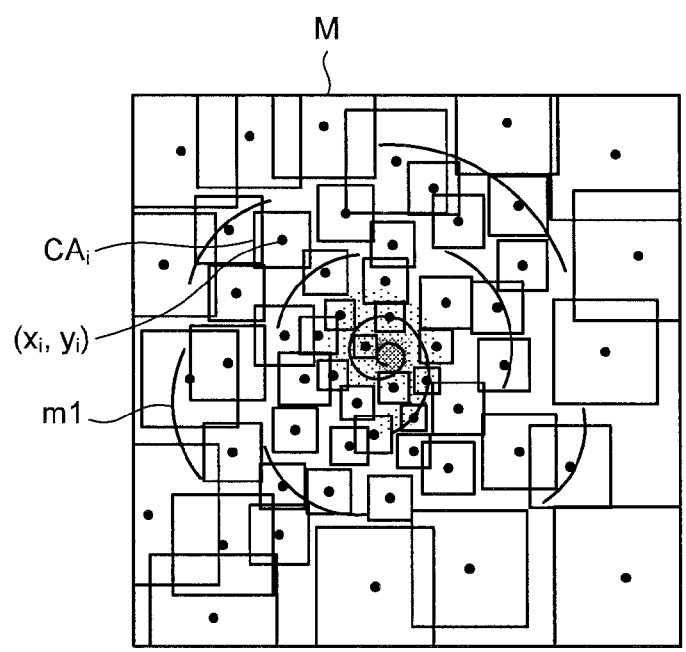
FIG. 13 is a schematic diagram for describing the process performed by the examination region setting unit illustrated in FIG. 9.

First, at step a131, as illustrated in FIG. 12, the candidate region setting unit 123 randomly determines positions ($x_i$, $y_i$), each of which is the center of an examination candidate region, at a plurality of locations in an image M.

At subsequent step a132, the representative-imaging-distance computing unit 123a computes an imaging distance to the mucous membrane in each position ($x_i$, $y_i$), as a representative imaging distance of the examination candidate region. More specifically, the representative-imaging-distance computing unit 123a estimates an imaging distance r for the case of assuming that the mucosal surface 8 (see FIG. 3) is a uniform diffused surface, based on the value of the low-absorption wavelength component (R component) of the pixel at each position ($x_i$, $y_i$), using the following equation (2).

$$r = \sqrt{\frac{I \times K \times \cos\theta}{L}} \tag{2}$$

In equation (2), the symbol "I" is the radiation intensity of a light source included in the endoscope 6, and a measured value which is measured in advance is applied. The symbol "K" is the diffuse reflection coefficient of the mucosal surface 8, and an average value is measured in advance and applied. The symbol "θ" is the angle formed by a normal vector to the mucosal surface 8 and a vector from the mucosal surface 8 to the light source (endoscope 6). Note that the angle θ is a value that is actually individually determined by the positional relationship between the light source provided at a distal end of the endoscope 6 and the mucosal surface 8, but an average value is set in advance and applied. The symbol "L" is the R component value of a pixel where an estimation target region on the mucosal surface 8 at the imaging distance r is displayed. Note that for the representative imaging distance, for example, an average of imaging distances at a plurality of locations within a specified range near the position $(x_i, y_i)$ may be used in addition to the imaging distance at the position $(x_i, y_i)$ which is the center of the examination candidate region.

Here, in an image, in general, a subject (mucous membrane) at a distant view is displayed smaller. Thus, if an examination region is set to be smaller for a longer imaging distance, then it is highly likely that the examination region does not include a contour edge region. Hence, at step a133, as illustrated in FIG. 13, the candidate region setting unit 123 sets examination candidate regions $CA_i$ having the positions $(x_i, y_i)$ at the centers thereof and having a size according to the imaging distance. Note that although FIG. 13 illustrates rectangular examination candidate regions $CA_i$, the shape of the examination regions is not particularly limited, and various shapes such as circle and ellipse can be used in addition to rectangle.

Subsequent processes at steps S132 and S133 are the same as those of the first embodiment (see FIG. 6).

Figure 14:
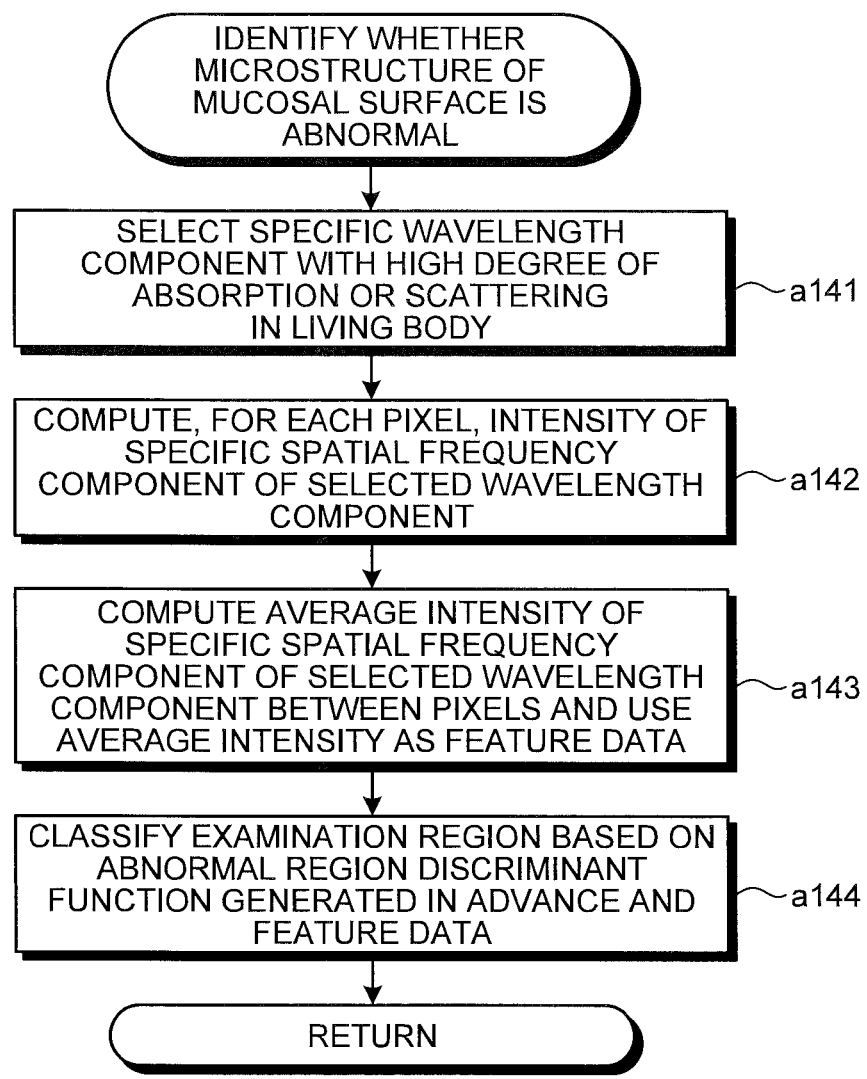
FIG. 14 is a flowchart illustrating a process performed by an abnormal structure identifying unit illustrated in FIG. 9.

FIG. 14 is a flowchart illustrating a process performed at step S14 by the abnormal structure identifying unit 130A.

Here, although in the first embodiment abnormalities in the microstructure of the mucosal surface are identified using all wavelength components (the R component, the G component, and the B component), in many cases, abnormalities in the microstructure of the mucosal surface are attributed to the formation states of capillaries. Hence, a wavelength component that is closer to the blood absorption band exhibits a more remarkable change between an abnormal region and a normal region.

Hence, at step a141, the specific wavelength component selector 133 selects a specific wavelength component with a high degree of absorption or scattering in a living body. Specifically, the G component or the B component is selected.

At subsequent step a142, the specific frequency component computing unit 134 computes, for each pixel and for each examination region, an intensity of a specific spatial frequency component of the selected wavelength component.

At subsequent step a143, the statistical classification unit 135 computes an average intensity of the specific spatial frequency component of the selected wavelength component, and uses the value of the average intensity as feature data.

Furthermore, at step a144, the abnormal structure identifying unit 130A performs classification as to whether each examination region is abnormal, based on abnormal region discriminant function generated in advance and the feature data computed at step a143. Note that the process using the discriminant function is the same as that of the first embodiment. Note, however, that in the computation formula for the classification index P(x) shown in equation (1), instead of the feature vector x, the feature data computed at step a143 is applied. In addition, instead of the average vector μ in equation (1), an average value of feature data of a plurality of abnormal region samples which are acquired in advance is applied. Furthermore, instead of the variance-covariance matrix Z in equation (1), variances of the plurality of abnormal region samples which are acquired in advance are applied, and instead of the inverse matrix $Z^{-1}$, the inverses of variances of the samples are applied. In addition, in equation (1), k=1.

Thereafter, processing returns to the main routine.

As described above, according to the modified example 1-2, since the size of an examination candidate region is changed according to the imaging distance at a position where an examination region is set, examination regions can be efficiently set. Thus, an abnormal structure identification process can be performed on a wider area of a mucosal surface. As a result, abnormalities in the microstructure of the mucosal surface can be accurately identified.

In addition, according to the modified example 1-2, since contour edge regions are extracted based on the value of a low-absorption wavelength component, erroneous discrimination of edges (also called absorption edges) generated by blood vessels, etc., as contour edges of a mucous membrane can be suppressed. Thus, the absorption edges that are effective for identification of abnormalities in microstructure can be included in examination regions. As a result, abnormalities in the microstructure of the mucosal surface can be accurately identified.

Furthermore, according to the modified example 1-2, since an abnormality identification process is performed based on the value of a high-absorption wavelength component, abnormalities in microstructure accompanied by a change in the absorption of the mucosal surface can be accurately identified.

Modified Example 1-3

Next, a modified example 1-3 of the first embodiment of the present invention will be described.

Figure 15:
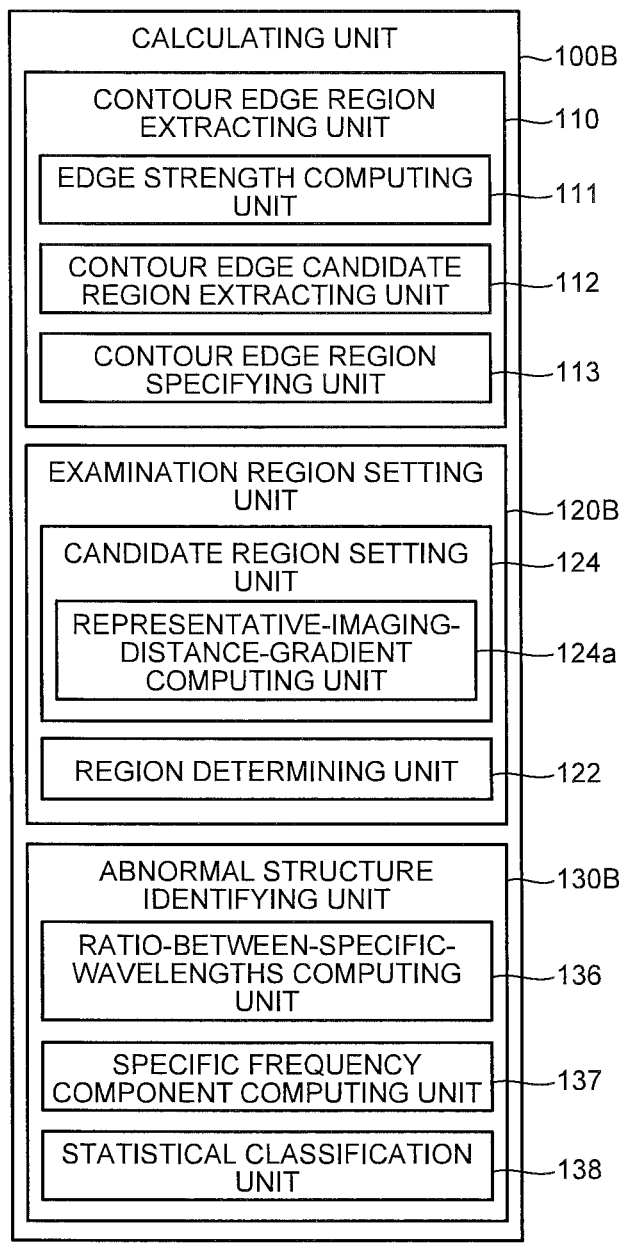
FIG. 15 is a block diagram illustrating a configuration of a calculating unit included in an image processing apparatus according to a modified example 1-3 of the first embodiment of the present invention.

FIG. 15 is a block diagram illustrating a configuration of a calculating unit included in an image processing apparatus according to the modified example 1-3. A calculating unit 100B illustrated in FIG. 15 includes a contour edge region extracting unit 110, an examination region setting unit 120B, and an abnormal structure identifying unit 130B. Note that the configuration and operation of the image processing apparatus other than the calculating unit 100B are the same as those of the first embodiment (see FIG. 1). Note also that the configuration and operation of the contour edge region extracting unit 110 are also the same as those of the first embodiment.

The examination region setting unit 120B includes a candidate region setting unit 124 instead of the candidate region setting unit 121 included in the examination region setting unit 120 illustrated in FIG. 1. The candidate region setting unit 124 includes a representative-imaging-distance-gradient computing unit 124a that computes a representative imaging distance gradient of an examination target displayed at a position where an examination candidate region is set. The candidate region setting unit 124 sets, in the image, an examination candidate region having a size according to the computed representative imaging distance gradient.

The abnormal structure identifying unit 130B includes a ratio-between-specific-wavelengths computing unit 136 that computes a ratio between specific wavelength components having different degrees of absorption or scattering in a living body; a specific frequency component computing unit 137 that computes a specific spatial frequency component for the computed ratio between specific wavelength components; and a statistical classification unit 138 that performs statistical classification based on the specific spatial frequency component. The abnormal structure identifying unit 130B identifies abnormalities in the microstructure in examination regions, based on a result of the classification performed based on the specific spatial frequency component for the ratio between wavelength components.

Next, the operation of the calculating unit 100B will be described. The operation of the calculating unit 100B as a whole is similar to that illustrated in FIG. 2. Details of processes performed by each of the examination region setting unit 120B (step S13) and the abnormal structure identifying unit 130B (step S14) differ from those of the first embodiment.

Figure 16:
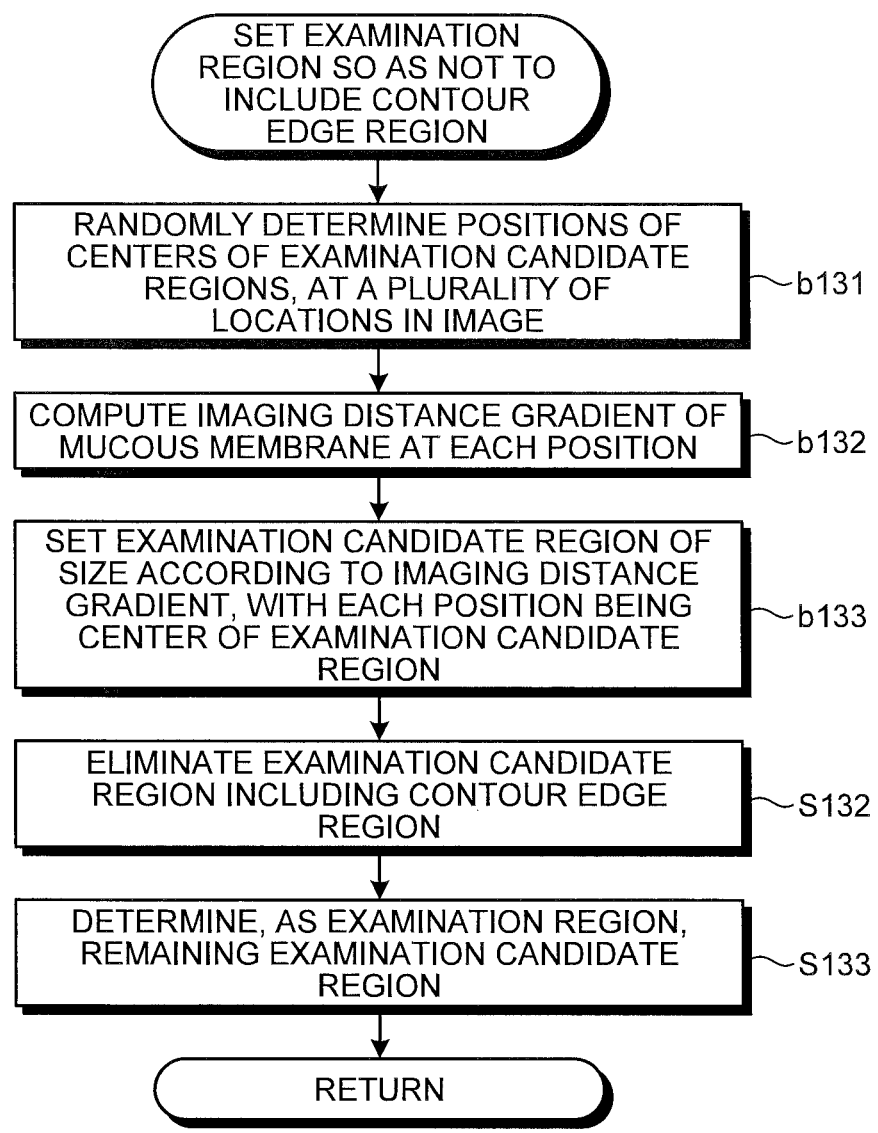
FIG. 16 is a flowchart illustrating a process performed by an examination region setting unit illustrated in FIG. 15.

FIG. 16 is a flowchart illustrating a process performed at step S13 by the examination region setting unit 120B.

First, at step b131, the candidate region setting unit 124 randomly determines positions ($x_i$, $y_i$), each of which is the center of an examination candidate region, at a plurality of locations in an image.

At subsequent step b132, the representative-imaging-distance-gradient computing unit 124a computes an imaging distance gradient of the mucous membrane displayed at each position ($x_i$, $y_i$), as a representative imaging distance gradient of the examination candidate region. More specifically, the representative-imaging-distance-gradient computing unit 124a computes imaging distances to the mucous membrane at each position ($x_i$, $y_i$) and at a pixel near the position ($x_i$, $y_i$), using equation (2). Then, a publicly known first derivative filter (See reference: Computer Graphic Arts Society, "Digital Image Processing", page 114 (derivative filter)) is applied to the values of the imaging distances, by which the absolute values of the computed values are obtained. Note that for the representative imaging distance gradient, for example, an average of imaging distance gradients at a plurality of locations within a specified range near the position ($x_i$, $y_i$) may be used in addition to the imaging distance gradient at the position ($x_i$, $y_i$) which is the center of the examination candidate region.

Here, in an intraluminal image, an image is captured in a direction with a larger inclination with respect to the mucous membrane for a larger imaging distance gradient, and thus, the actual area of the mucous membrane in a region per unit area in the image is large. Hence, setting a smaller examination region for a larger imaging distance gradient of the mucous membrane displayed at a position where the examination region is set increases the possibility of the examination region not including a contour edge region.

Hence, at step b133, the candidate region setting unit 124 sets examination candidate regions each having a size according to the imaging distance gradient, with the positions ($x_i$, $y_i$) being the centers of the examination candidate regions. Specifically, the size of an examination region is determined such that the larger the imaging distance gradient, the larger the examination region.

Subsequent processes at steps S132 and S133 are the same as those of the first embodiment (see FIG. 6).

Figure 17:
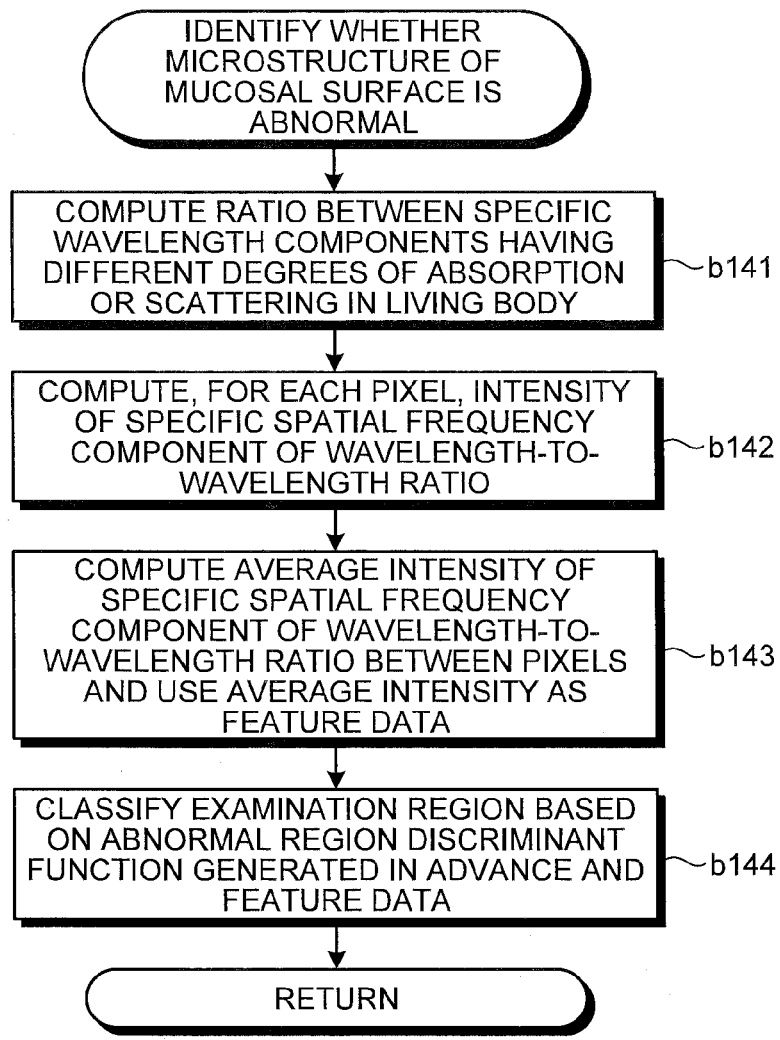
FIG. 17 is a flowchart illustrating a process performed by an abnormal structure identifying unit illustrated in FIG. 15.

FIG. 17 is a flowchart illustrating a process performed at step S14 by the abnormal structure identifying unit 130B.

Here, in the above-described modified example 1-2, abnormalities in microstructure are identified using a specific spatial frequency component of a specific wavelength with a high degree of absorption or scattering in a living body. However, since a change in the pixel value of such a specific wavelength is likely to be influenced by the imaging distance, the change is small at a distant view and the change is large at a near view. Hence, an average intensity of a specific spatial frequency component computed for a high-absorption wavelength component turns out to include a change according to the imaging distance. Accordingly, if an abnormal structure identification process is performed using the same discriminant function for the distant view and the near view, then the identification accuracy may degrade. Hence, in the modified example 1-3, in order to suppress the influence of a change in pixel value associated with the imaging distance, a ratio between specific wavelength components having different degrees of absorption or scattering in a living body is computed, and an abnormal structure identification process for an examination region is performed based on a specific spatial frequency component for the ratio.

Specifically, at step b141, the ratio-between-specific-wavelengths computing unit 136 computes, based on the pixel value of each pixel in an examination region, for example, a ratio of a G component value to an R component value (G/R), as a ratio between specific wavelength components having different degrees of absorption or scattering in a living body. The ratio is hereinafter referred to as a wavelength-to-wavelength ratio.

At subsequent step b142, the specific frequency component computing unit 137 computes, for each pixel and for each examination region, an intensity of a specific spatial frequency component of the computed wavelength-to-wavelength ratio. Note that the specific spatial frequency component is set in advance based on teacher data, etc.

At subsequent step b143, the statistical classification unit 138 computes, for each examination region, an average intensity of the specific spatial frequency component of the wavelength-to-wavelength ratio between pixels, and uses the value of the average intensity as feature data.

Furthermore, at step b144, the abnormal structure identifying unit 130B performs classification as to whether each examination region is abnormal, based on an abnormal region discriminant function generated in advance and the feature data computed at step b143. Note that the process using the discriminant function is the same as that of the modified example 1-2.

Thereafter, processing returns to the main routine.

As described above, according to the modified example 1-3, since the size of an examination region is changed according to the imaging distance gradient at a position where the examination region is set, examination regions can be efficiently set. Thus, an abnormal structure identification process can be performed on a wider area of a mucosal surface. As a result, abnormalities in the microstructure of the mucosal surface can be accurately identified.

In addition, according to the modified example 1-3, a wavelength-to-wavelength ratio is used when abnormalities in the microstructure of the mucosal surface are identified. Thus, the influence of a change in pixel value associated with the imaging distance which is exerted on a change in the intensity of a specific spatial frequency component is suppressed, enabling to accurately identify abnormalities in microstructure.

Modified Example 1-4

Next, a modified example 1-4 of the first embodiment of the present invention will be described.

Figure 18:
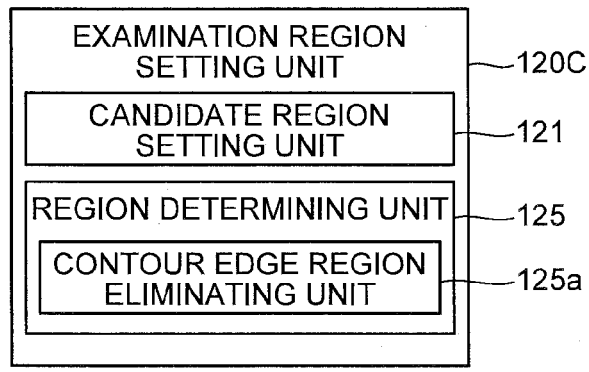
FIG. 18 is a block diagram illustrating a configuration of an examination region setting unit included in an image processing apparatus according to a modified example 1-4 of the first embodiment of the present invention.

FIG. 18 is a block diagram illustrating a configuration of a part of a calculating unit included in an image processing apparatus according to the modified example 1-4. The image processing apparatus according to the modified example 1-4 includes an examination region setting unit 120C illustrated in FIG. 18, instead of the examination region setting unit 120 illustrated in FIG. 1.

The examination region setting unit 120C includes a candidate region setting unit 121 and an region determining unit 125. Of these units, the operation of the candidate region setting unit 121 is the same as that of the first embodiment. In addition, the region determining unit 125 includes a contour edge region eliminating unit 125a that eliminates contour edge regions present in examination candidate regions which are set by the candidate region setting unit 121. The region determining unit 125 determines, as examination regions, examination candidate regions that remain after eliminating the contour edge regions.

Figure 19:
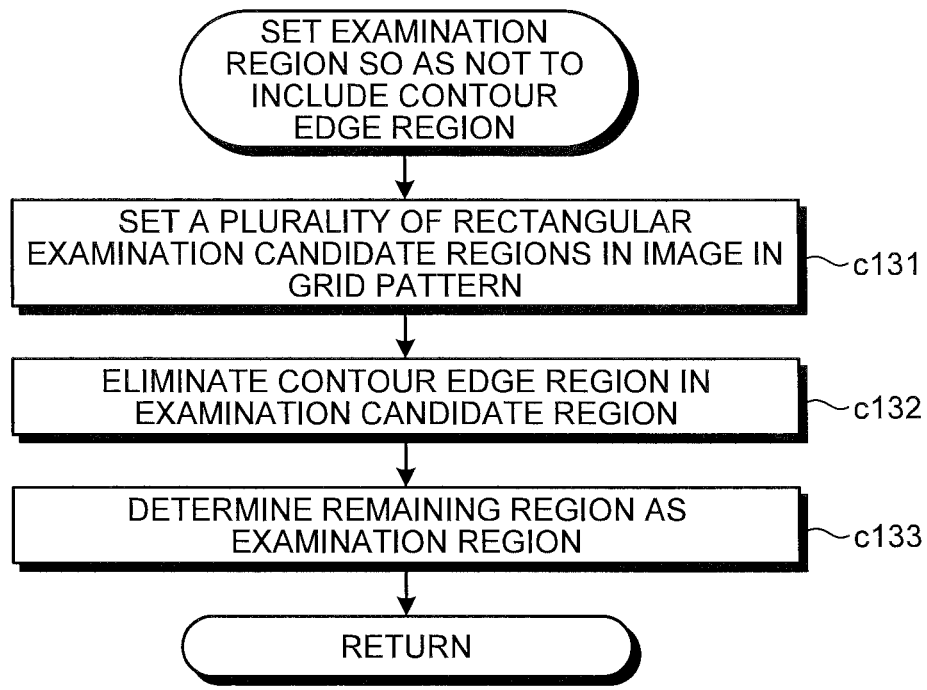
FIG. 19 is a flowchart illustrating a process performed by the examination region setting unit illustrated in FIG. 18.

Next, a process performed by the examination region setting unit 120C will be described. FIG. 19 is a flowchart illustrating a process performed by the examination region setting unit 120C. In the following, as an example, a process performed on the image M illustrated in FIG. 4 will be described.

First, at step c131, the candidate region setting unit 121 sets a plurality of rectangular examination candidate regions CA of a specified size in a grid pattern in the image M which is a processing target (see FIG. 7).

Figure 20:
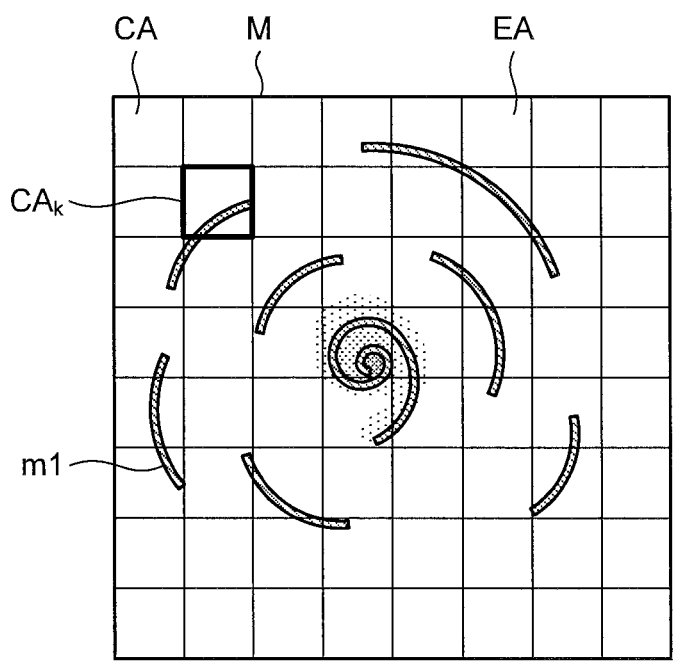
FIG. 20 is a schematic diagram for describing the process performed by the examination region setting unit illustrated in FIG. 18.

At subsequent step c132, the contour edge region eliminating unit 125a eliminates contour edge regions m1 in the examination candidate regions CA. By that, as illustrated in FIG. 20, the contour edge regions m1 indicated by oblique lines are eliminated.

Furthermore, at step c133, the region determining unit 125 determines, as examination regions, regions that remain without being eliminated. For example, in the case of FIG. 20, in addition to determining, as an examination region EA, an examination candidate region CA that does not include a contour edge region m1 from the start, a remaining region where a contour edge region m1 is eliminated from an examination candidate region $CA_k$ including the contour edge region m1 is also set as one examination region.

Thereafter, processing returns to the main routine.

As described above, in the modified example 1-4, instead of eliminating all candidate regions including contour edge regions among examination candidate regions set in a grid pattern, only the contour edge regions are eliminated and the remaining regions are set as examination regions. Thus, an abnormal structure identification process can be performed on a wider area of a mucosal surface. As a result, abnormalities in the microstructure of the mucosal surface can be accurately identified.

Note that by combining the modified example 1-4 with the modified example 1-2 or 1-3, contour edge regions may be eliminated from examination candidate regions which are set to have a size according to the imaging distance or imaging distance gradient, and regions that remain without being eliminated may be set as examination regions.

Modified Example 1-5

Next, a modified example 1-5 of the first embodiment of the present invention will be described.

Figure 21:
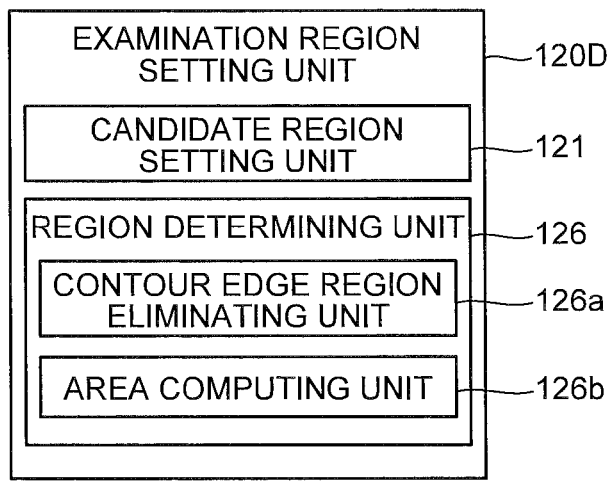
FIG. 21 is a block diagram illustrating a configuration of an examination region setting unit included in an image processing apparatus according to a modified example 1-5 of the first embodiment of the present invention.

FIG. 21 is a block diagram illustrating a configuration of a part of a calculating unit included in an image processing apparatus according to the modified example 1-5. The image processing apparatus according to the modified example 1-5 includes an examination region setting unit 120D illustrated in FIG. 21, instead of the examination region setting unit 120 illustrated in FIG. 1.

The examination region setting unit 120D includes a candidate region setting unit 121 and an region determining unit 126. Of these units, the operation of the candidate region setting unit 121 is the same as that of the first embodiment. In addition, the region determining unit 126 includes a contour edge region eliminating unit 126a that eliminates a contour edge region present in an examination candidate region; and an area computing unit 126b that computes the area of an examination candidate region that remains without being eliminated. The region determining unit 126 determines an examination region, based on the computed area of the examination candidate region.

Figure 22:
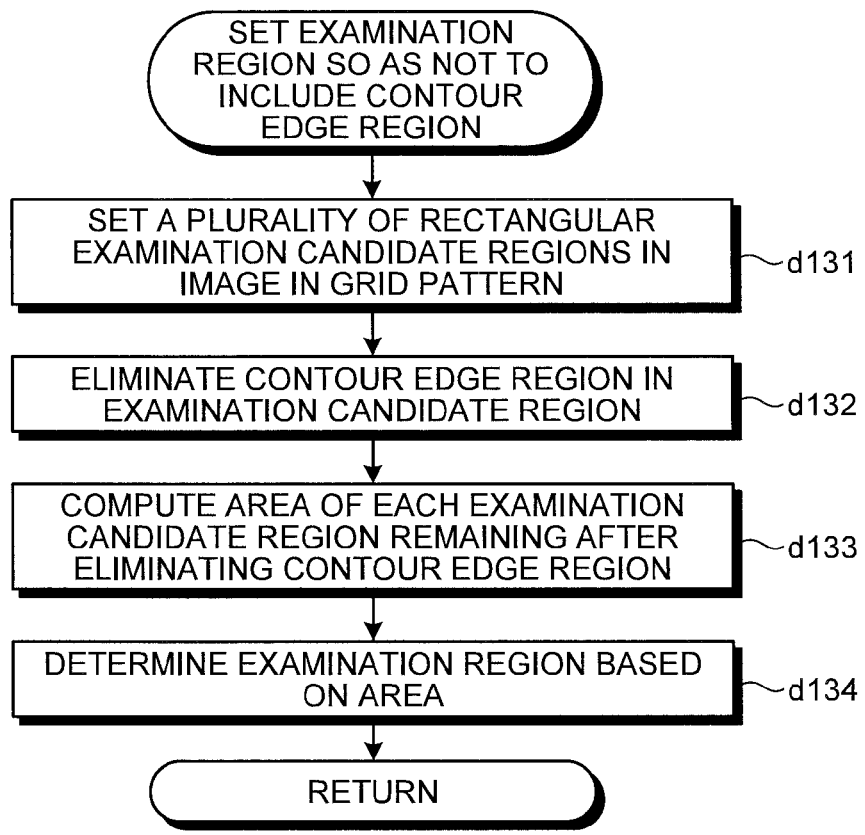
FIG. 22 is a flowchart illustrating a process performed by the examination region setting unit illustrated in FIG. 21.

Next, a process performed by the examination region setting unit 120D will be described. FIG. 22 is a flowchart illustrating a process performed by the examination region setting unit 120D. In the following, as an example, a process performed on the image M illustrated in FIG. 4 will be described.

First, at step d131, the candidate region setting unit 121 sets a plurality of rectangular examination candidate regions CA of a specified size in a grid pattern in the image M which is a processing target (see FIG. 7).

Figure 23:
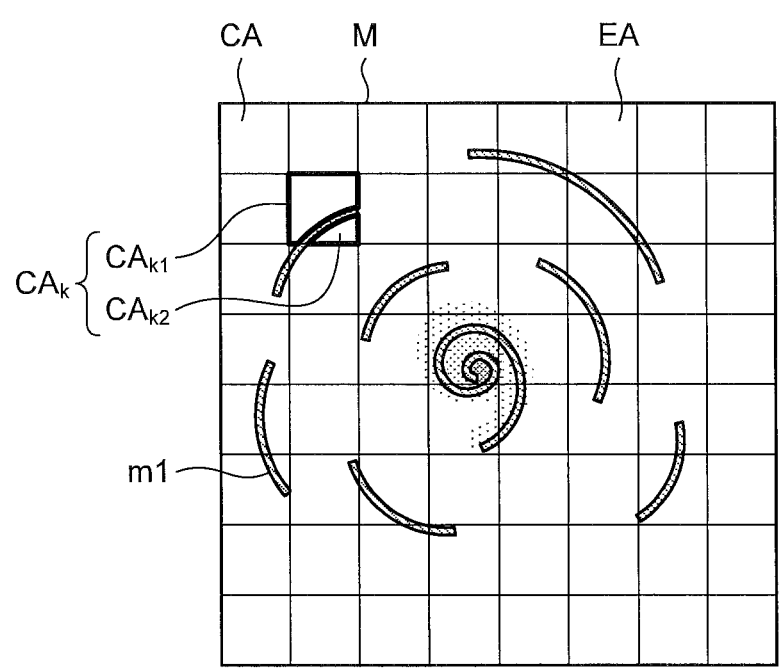
FIG. 23 is a schematic diagram for describing the process performed by the examination region setting unit illustrated in FIG. 21.

At subsequent step d132, the contour edge region eliminating unit 126a eliminates a contour edge region m1 in an examination candidate region CA. By performing this process on all of the examination candidate regions CA, as illustrated in FIG. 23, contour edge regions m1 indicated by oblique lines are eliminated from examination regions.

Here, in each examination candidate region CA, in examination candidate regions which are separated by eliminating a contour edge region m1 (e.g., regions $CA_{k1}$ and $CA_{k2}$ generated by cutting off an examination candidate region $CA_k$), it is highly likely that a discontinuous mucosal surface is present in real space. Hence, if the regions are combined together and subsequent processes are performed as one examination region, then the identification accuracy of an abnormal structure may degrade. In addition, a region that has become very small as a result of separation (e.g., the region $CA_{k2}$) has a small number of pixels and thus sufficient identification accuracy cannot be obtained. Thus, it is desirable to eliminate the region in advance.

Hence, at step d133, the area computing unit 126b computes the area of each examination candidate region CA that remains after eliminating a contour edge region m1. At this time, for cut-off regions (e.g., the regions $CA_{k1}$ and $CA_{k2}$), the area is computed for each region.

Furthermore, at step d134, the region determining unit 126 determines examination regions, based on the areas computed by the area computing unit 126b. Specifically, an examination candidate region (e.g., the region $CA_{k2}$) with an area less than or equal to a predetermined threshold value as a result of separation is eliminated, and each remaining examination candidate region is determined as an examination region.

Thereafter, processing returns to the main routine.

As described above, according to the modified example 1-5, an examination region is determined based on the areas of examination candidate regions which are separated by eliminating a contour edge region. Thus, while a region where a discontinuous mucosal surface is considered to be present in real space is divided, an examination region having a size effective for identification of an abnormal structure can be set. Accordingly, abnormalities in the microstructure of the mucosal surface can be accurately identified.

Note that by combining the modified example 1-5 with the modified example 1-2 or 1-3, contour edge regions may be eliminated from examination candidate regions which are set to have a size according to the imaging distance or imaging distance gradient, and examination regions may be set based on the areas of examination candidate regions that remain without being eliminated.

Second Embodiment

Next, a second embodiment of the present invention will be described.

Figure 24:
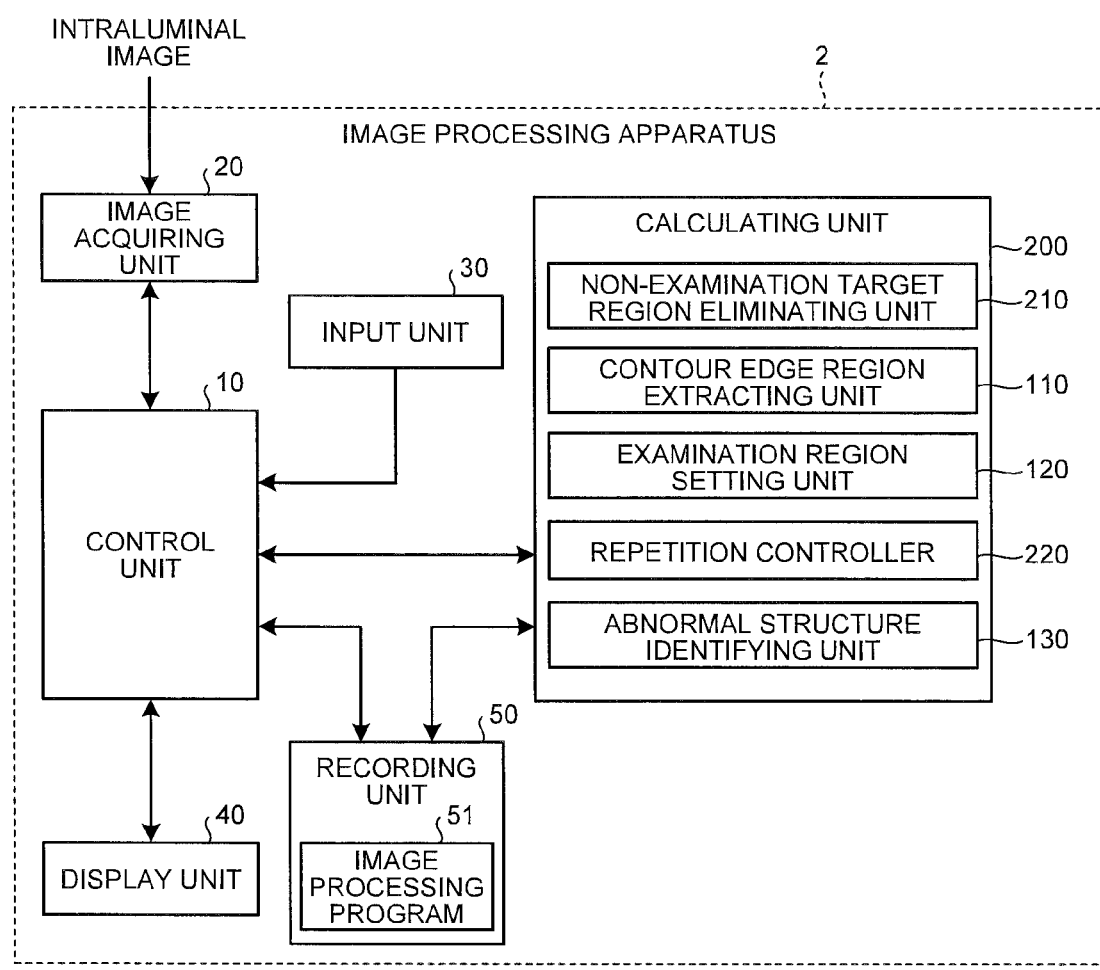
FIG. 24 is a block diagram illustrating a configuration of an image processing apparatus according to a second embodiment of the present invention.

FIG. 24 is a block diagram illustrating a configuration of an image processing apparatus according to the second embodiment. As illustrated in FIG. 24, an image processing apparatus 2 according to the second embodiment includes a calculating unit 200 instead of the calculating unit 100 illustrated in FIG. 1. Note that the configurations and operation of those units of the image processing apparatus 2 other than the calculating unit 200 are the same as those of the first embodiment.

The calculating unit 200 includes a non-examination target region eliminating unit 210 that eliminates regions which are not targets for an abnormal structure identification process (non-examination target regions), from setting of the examination region; a contour edge region extracting unit 110; an examination region setting unit 120; a repetition controller 220 that repeatedly performs the setting of examination regions, on regions where examination regions have not been set; and an abnormal structure identifying unit 130. Of these units, the configurations and operation of the contour edge region extracting unit 110, the examination region setting unit 120, and the abnormal structure identifying unit 130 are the same as those of the first embodiment.

Figure 25:
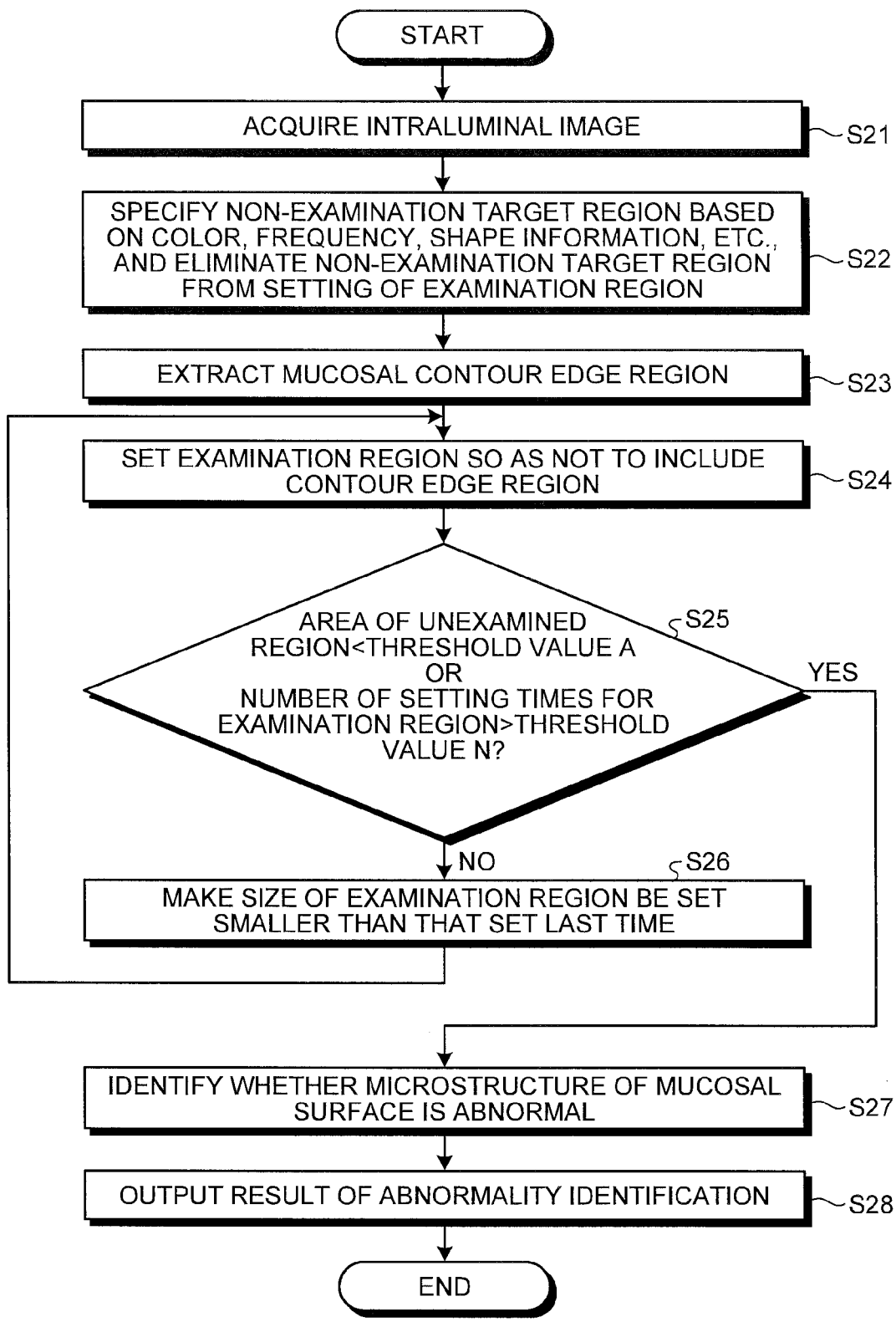
FIG. 25 is a flowchart illustrating the operation of the image processing apparatus illustrated in FIG. 24.

Next, the operation of the image processing apparatus 2 will be described. FIG. 25 is a flowchart illustrating the operation of the image processing apparatus 2.

First, at step S21, the calculating unit 200 reads image data recorded in a recording unit 50 and thereby acquires an intraluminal image which is a processing target.

At subsequent step S22, the non-examination target region eliminating unit 210 specifies non-examination target regions such as dark parts, bright parts, residues, and bubbles, based on color information, frequency information, shape information, etc., which can be acquired from the image, and eliminates the non-examination target regions from setting of the examination region.

Here, in the intraluminal image, a region (dark part) where a deep part of a lumen is displayed, a halation region (bright part) caused by a specular reflection from a subject surface, a region where a residue or a bubble is displayed, etc., are present in addition to a mucosal region which is an examination target. If these regions are mixed in examination regions, then the identification accuracy of abnormalities in microstructure degrades. Hence, the non-examination target region eliminating unit 210 extracts, from the image, regions where bright parts, dark parts, residues, bubbles, etc., are displayed, and eliminates the regions in advance as non-examination target regions. Note that the non-examination target regions can be extracted by various publicly known methods. For example, a dark part can be extracted by extracting a black region based on color feature data obtained based on color information (the values of an R component, a G component, and a B component, etc.) of each pixel in the image, and discriminating whether the black region is a dark part, based on a direction in which pixel values around the black region change (See reference: Japanese Patent Application Laid-open No. 2011-234931). In addition, a bright part can be extracted by, for example, extracting a white region based on color feature data of each pixel in the image, and discriminating whether the white region is a halation region, based on changes in pixel values near a boundary of the white region (as above). A residue can be extracted by, for example, detecting a residue candidate region which is considered a non-mucosal region, based on color feature data of each pixel in the image, and discriminating whether the residue candidate region is a mucosal region, based on the positional relationship between the residue candidate region and a structure edge in the image. A bubble can be extracted by, for example, extracting an edge from within the image and computing a correlation value between a bubble model which is set in advance based on the features of a bubble image and the extracted edge (See reference: Japanese Patent Application Laid-open No. 2007-313119).

At subsequent step S23, the contour edge region extracting unit 110 extracts mucosal contour edge regions. Note that this extraction process is the same as that of the first embodiment (see FIG. 5).

At subsequent step S24, the examination region setting unit 120 sets examination regions in the remaining image region where the non-examination target regions are eliminated, so as not to include the contour edge regions. Note that this examination region setting process is the same as that of the first embodiment (see FIG. 6). As a result, for example, as illustrated in FIG. 7, regions other than examination candidate regions $CA_{in}$ indicated by oblique lines are set as examination regions EA.

At step S25, the repetition controller 220 determines whether the area of unexamined regions which are regions where examination regions are not yet set is smaller than a predetermined threshold value (threshold value A) or whether the number of setting times that examination regions have been set so far is greater than a predetermined threshold value (threshold value N). For example, when the number of setting times is the first time, the area of all examination candidate regions $CA_{in}$ (oblique line portions) which are eliminated from the examination regions EA is compared with the threshold value A.

Here, when examination regions are not sufficiently set in the image, the identification accuracy of abnormalities in microstructure may degrade. Hence, if the area of unexamined regions is greater than or equal to the threshold value A and the number of setting times for examination regions is less than or equal to the threshold value N (step S25: No), the repetition controller 220 determines that further setting of examination regions is required, and thus, makes the sizes of examination regions be set smaller than those set last time (step S26). Then, the repetition controller 220 proceeds to step S24 and causes the examination region setting unit 120 to perform the setting of examination regions again.

For example, in the case of FIG. 7, the process of setting examination regions with a reduced size is performed on examination candidate regions $CA_{in}$ that have not been set as examination regions EA last time. By thus reducing the sizes of the examination regions, it is highly likely that examination candidate regions do not include contour edge regions m1, increasing the chance of increasing the number of regions in the image M that can be set as examination regions.

On the other hand, if the area of unexamined regions is smaller the threshold value A or the number of setting times for examination regions is greater than the threshold value N (step S25: Yes), the repetition controller 220 determines that further setting of examination regions is not required, and thus, proceeds to step S27.

At step S27, the abnormal structure identifying unit 130 identifies, for the set examination regions, whether the microstructure of the mucosal surface is abnormal. Note that this identification process is the same as that of the first embodiment (see FIG. 8).

Thereafter, at step S28, the calculating unit 200 outputs a result of the abnormality identification obtained at step S27 and causes a display unit 40 to display the result, and causes the recording unit 50 to record the result. Thereafter, the process performed by the image processing apparatus 2 ends.

As described above, according to the second embodiment, non-examination target regions are eliminated in advance and then examination regions are set. Thus, abnormalities in microstructure can be accurately identified. In addition, since the setting of examination regions is repeatedly performed, abnormalities in microstructure can be identified for a wide area of a mucosal surface. At this time, since the sizes of examination regions are reduced every time the process is repeated, the number of examination regions that can be set increases, enabling to identify abnormalities in microstructure for a wider area of a mucosal surface. As a result, the identification accuracy of abnormalities in microstructure can be improved.

Note that the non-examination target region eliminating unit 210 and the repetition controller 220 which are described in the above-described second embodiment may be provided in the image processing apparatus according to the modified example 1-2 or 1-3.

Third Embodiment

Next, a third embodiment of the present invention will be described.

Figure 26:
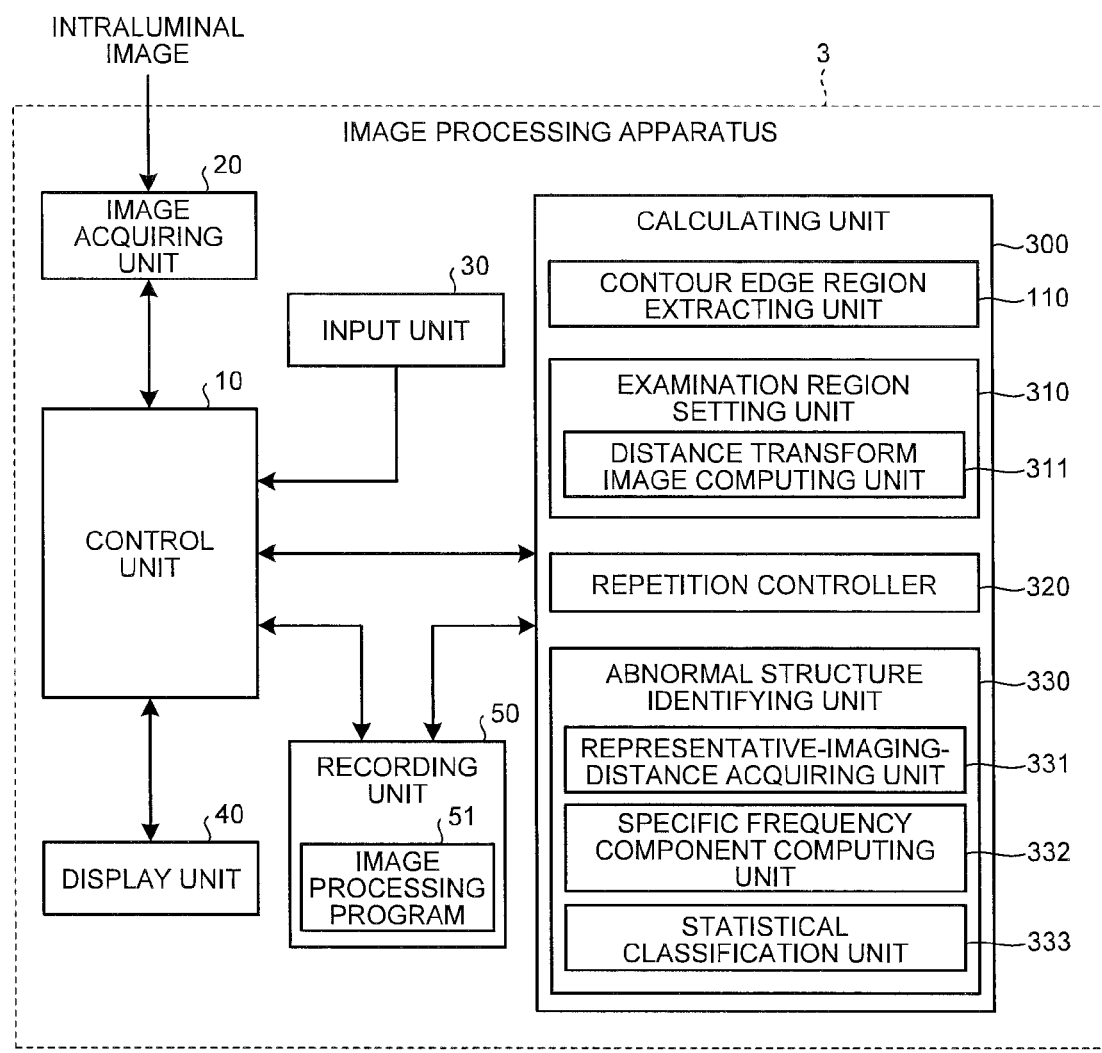
FIG. 26 is a block diagram illustrating a configuration of an image processing apparatus according to a third embodiment of the present invention.

FIG. 26 is a block diagram illustrating a configuration of an image processing apparatus according to the third embodiment of the present invention. As illustrated in FIG. 26, an image processing apparatus 3 according to the third embodiment includes a calculating unit 300 instead of the calculating unit 100 illustrated in FIG. 1. The configurations and operation of those units of the image processing apparatus 3 other than the calculating unit 300 are the same as those of the first embodiment.

The calculating unit 300 includes a contour edge region extracting unit 110; an examination region setting unit 310 that sets examination regions, based on a distance transform image which will be described later; a repetition controller 320 that repeatedly performs the setting of examination regions, on regions where examination regions have not been set; and an abnormal structure identifying unit 330 that identifies abnormalities in microstructure in examination regions, based on the intensity of a specific frequency component which is specified according to an imaging distance to a mucosal surface. Of these units, the configuration and operation of the contour edge region extracting unit 110 are the same as those of the first embodiment.

The examination region setting unit 310 includes a distance transform image computing unit 311 that computes a distance transform image where a distance between each pixel in an image and a contour edge region or an edge of the image is transformed into a pixel value. The examination region setting unit 310 sets examination regions in the image, based on the computed distance transform image.

The abnormal structure identifying unit 330 includes a representative-imaging-distance acquiring unit 331 that acquires a representative imaging distance to a mucous membrane in an examination region; a specific frequency component computing unit 332 that computes a specific spatial frequency component which is specified according to the representative imaging distance; and a statistical classification unit 333 that performs statistical classification based on the specific spatial frequency component. The abnormal structure identifying unit 330 identifies an abnormality in microstructure in the examination region, based on a result of the classification performed based on the specific spatial frequency component according to the representative imaging distance.

Figure 27:
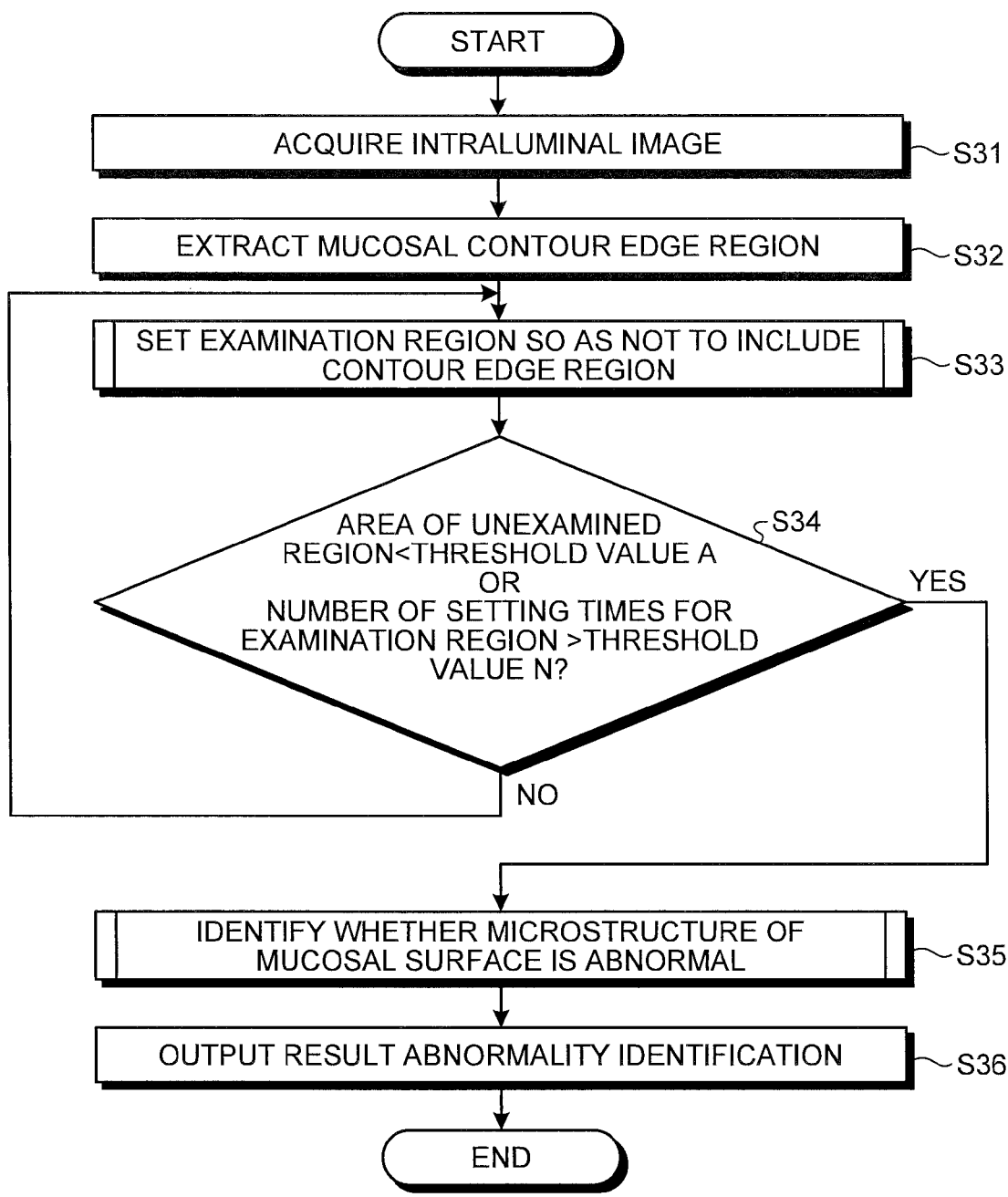
FIG. 27 is a flowchart illustrating the operation of the image processing apparatus illustrated in FIG. 26.

Next, the operation of the image processing apparatus 3 will be described. FIG. 27 is a flowchart illustrating the operation of the image processing apparatus 3.

First, at step S31, the calculating unit 300 reads image data recorded in a recording unit 50 and thereby acquires an intraluminal image which is a processing target.

At subsequent step S32, the contour edge region extracting unit 110 extracts mucosal contour edge regions. Note that this extraction process is the same as that of the first embodiment (see FIG. 5).

At step S33, the examination region setting unit 310 sets examination regions so as not to include the contour edge regions. Here, when, as in the first embodiment, examination candidate regions are set and those of the examination candidate regions that meet a condition that a contour edge region is not included are determined as examination regions, if the number of candidate regions that meet the condition is small, then sufficient identification accuracy may not be able to be obtained. Hence, in the third embodiment, in order to more efficiently set examination regions based on the results of extraction of contour edge regions, a distance transform image is used.

Figure 28:
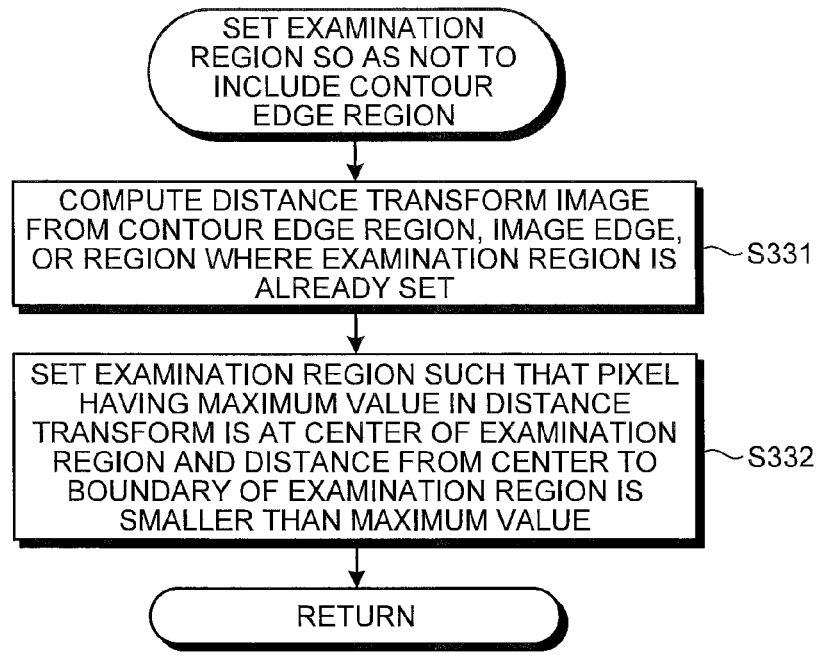
FIG. 28 is a flowchart illustrating details of a process performed by an examination region setting unit illustrated in FIG. 26.

FIG. 28 is a flowchart illustrating details of a process performed by the examination region setting unit 310.

Figure 29:
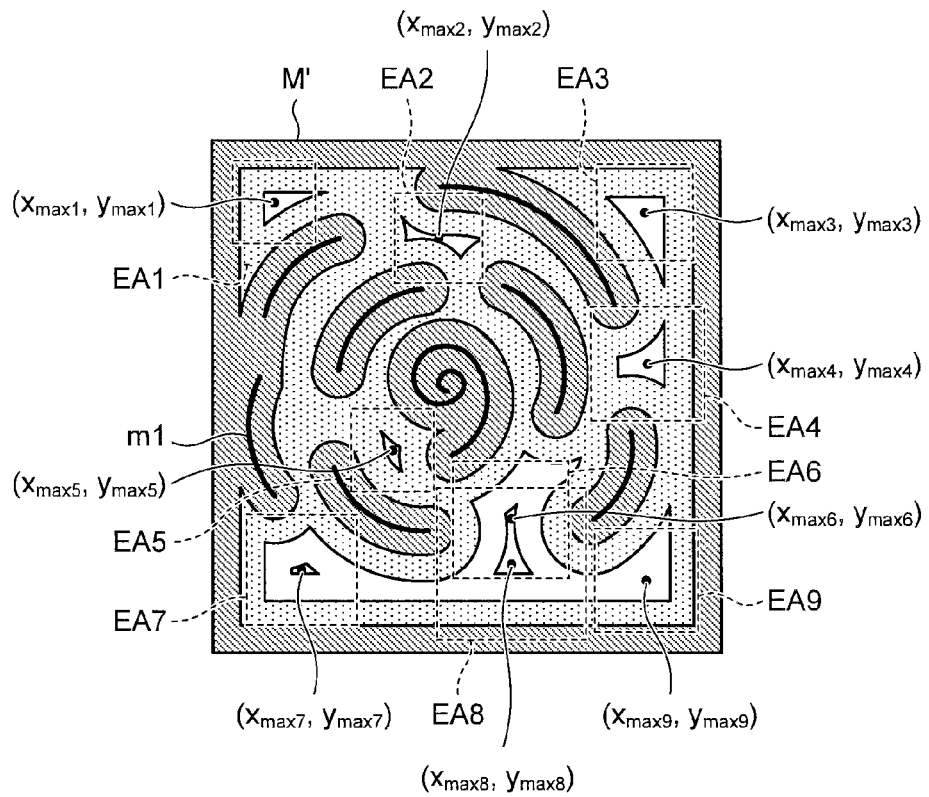
FIG. 29 is a schematic diagram illustrating a distance transform image which is created from the image illustrated in FIG. 4.

At step S331, the distance transform image computing unit 311 computes a distance transform image where a distance from a contour edge region, an image edge, or a region where an examination region is already set, to each pixel is transformed into the pixel value of the pixel. FIG. 29 is a schematic diagram illustrating a distance transform image which is created from an image M where contour edge regions m1 are present (see FIG. 4). In FIG. 29, regions in a distance transform image M' are shown in different patterns according to the distance from the edges of the image M or from contour edge regions m1.

At subsequent step S332, the examination region setting unit 310 sets an examination region such that a pixel having a maximum pixel value in the distance transform image is at the center of the examination region and the distance from the center to a boundary of the examination region is smaller than the maximum value. For example, in the case of FIG. 29, points with maximum pixel values, i.e., points $(x_{max1}, y_{max1})$ to $(x_{max9}, y_{max9})$ having maximum distances from an edge of the image M or a contour edge region m1, are extracted and examination regions EA1 to EA9 having these points at the centers thereof are set.

Thereafter, processing returns to the main routine.

At step S34 subsequent to step S33, the repetition controller 320 determines whether the area of unexamined regions which are regions where examination regions are not yet set is smaller than a predetermined threshold value (threshold value A) or whether the number of setting times that examination regions have been set so far is greater than a predetermined threshold value (threshold value N).

If the area of unexamined regions is greater than or equal to the threshold value A and the number of setting times for examination regions is less than or equal to the threshold value N (step S34: No), the repetition controller 320 determines that further setting of examination regions is required, and thus, proceeds to step S33 and causes the examination region setting unit 310 to perform the setting of examination regions again. For example, after the examination regions EA1 to EA9 are set, a distance transform image from the contour edge regions m1, the edges of the image M, or the examination regions EA1 to EA9 is computed and new examination regions are set based on the distance transform image.

On the other hand, if the area of unexamined regions is smaller the threshold value A or the number of setting times for examination regions is greater than the threshold value N (step S34: Yes), the repetition controller 320 determines that further setting of examination regions is not required, and thus, proceeds to step S35.

Figure 30:
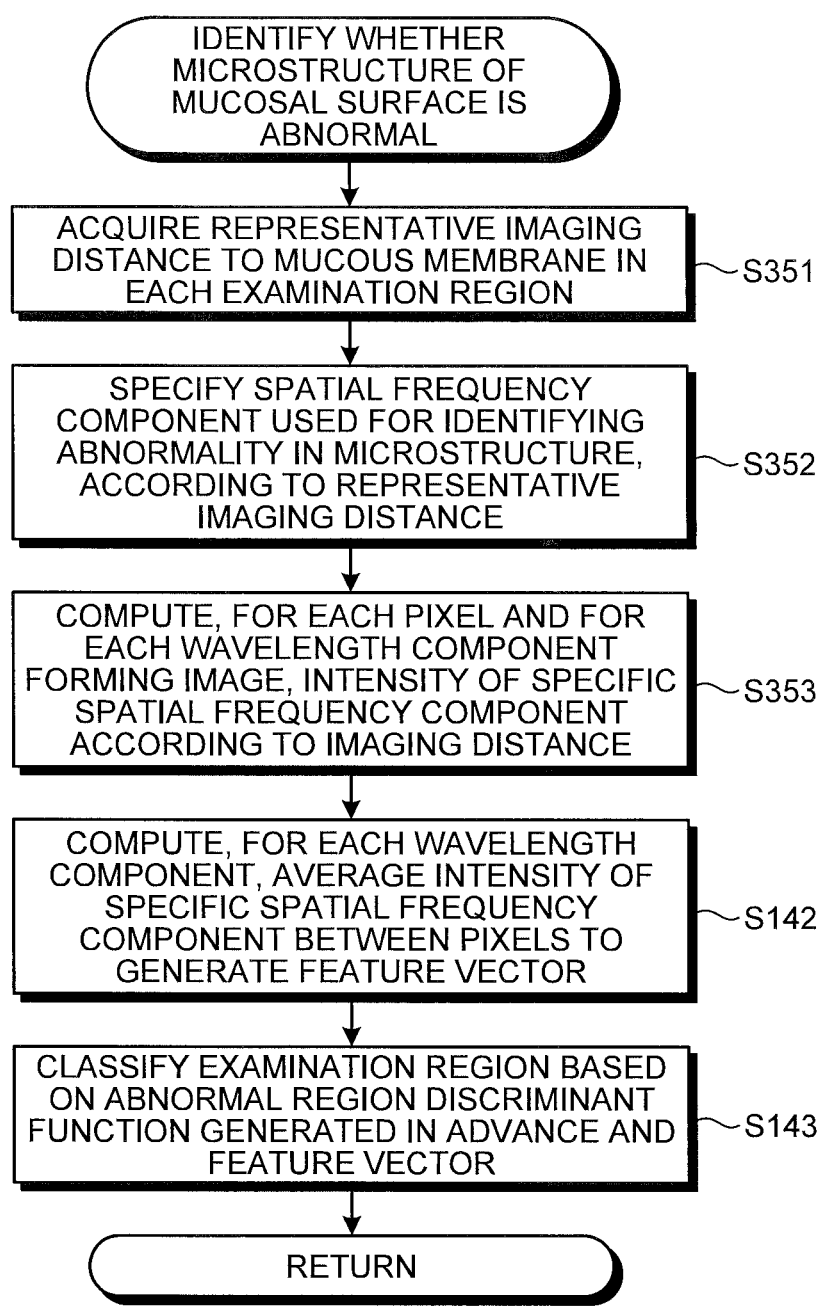
FIG. 30 is a flowchart illustrating details of a process performed by an abnormal structure identifying unit illustrated in FIG. 26.

At step S35, the abnormal structure identifying unit 330 identifies whether the microstructure on the mucosal surface in the examination regions is abnormal. FIG. 30 is a flowchart illustrating details of a process performed by the abnormal structure identifying unit 330.

At step S351, the representative-imaging-distance acquiring unit 331 acquires a representative imaging distance to a mucous membrane in each examination region. For the representative imaging distance, for example, an average value of an imaging distance to the mucous membrane included in the examination region, an imaging distance at the coordinates of the center of gravity of the examination region, or the like, is used. Note that the imaging distance at each pixel position is given by equation (2).

Figure 31:
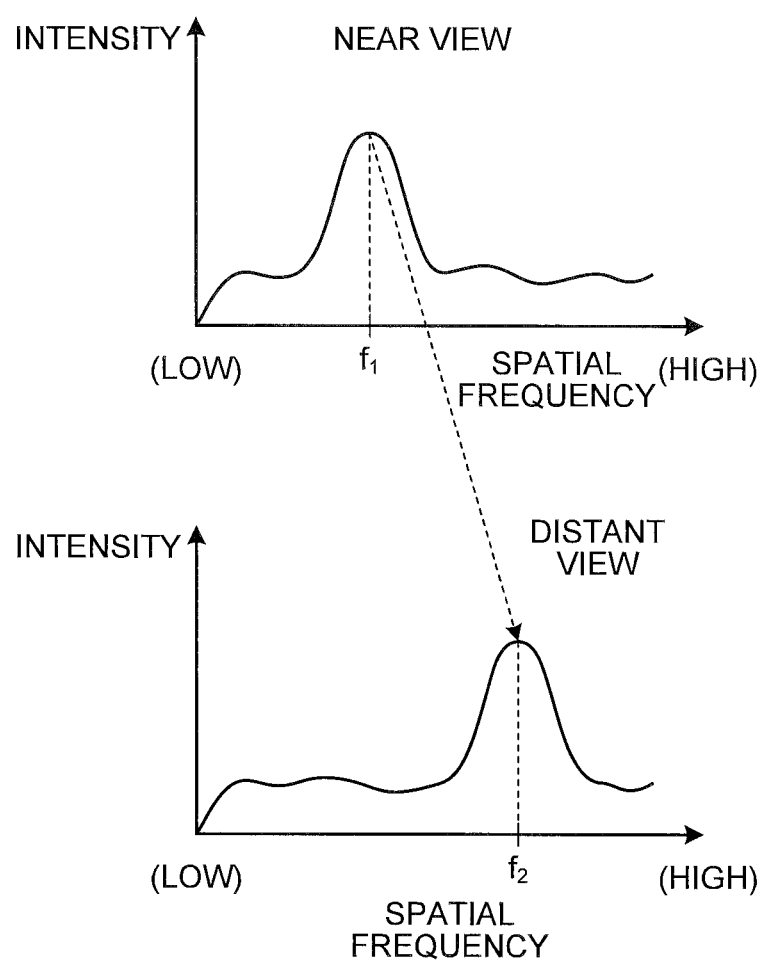
FIG. 31 is a schematic diagram illustrating frequency-component-to-intensity characteristics according to an imaging distance in an intraluminal image.

Here, in an intraluminal image captured by an endoscope, the resolution of the microstructure of the mucosal surface varies according to the imaging distance, and thus, the specific spatial frequency component that can identify abnormalities in microstructure also varies according to the imaging distance. Specifically, the longer the imaging distance, the lower the resolution. Hence, for example, as shown in FIG. 31, when the specific spatial frequency that can identify an abnormality in microstructure in the case of a short imaging distance (near view) is $f_1$, if the imaging distance increases, then the spatial frequency that can identify the same abnormality in microstructure shifts to the high-frequency side (distant view: spatial frequency $f_2$).

Hence, at step S352, the specific frequency component computing unit 332 specifies a spatial frequency component used for identifying abnormalities in microstructure, according to a representative imaging distance. Specifically, a higher specific spatial frequency component is set for a longer imaging distance so that a finer structure can be detected. On the other hand, a lower specific spatial frequency component is set for a shorter imaging distance to suppress the influence of noise associated with an improvement in resolution. By that, an improvement in the identification accuracy of abnormalities in the microstructure of the mucosal surface is achieved. Note that specific spatial frequency components according to the imaging distance are set in advance based on teacher data, etc.

At subsequent step S353, the specific frequency component computing unit 332 computes, for each pixel and for each wavelength component forming the image, an intensity of a specific spatial frequency component according to the imaging distance. Note that the process of computing an intensity of a specific spatial frequency component is the same as that of the first embodiment (see step S141 in FIG. 8).

Subsequent steps S142 and S143 are the same as those of the first embodiment. Thereafter, processing returns to the main routine.

At step S36 subsequent to step S35, the calculating unit 300 outputs a result of the abnormality identification obtained at step S35 and causes a display unit 40 to display the result, and causes the recording unit 50 to record the result. Thereafter, the process performed by the image processing apparatus 3 ends.

As described above, according to the third embodiment, examination regions can be efficiently set over a wide range in an image without repeating processes such as the setting of examination candidate regions and the determination of examination regions. As a result, abnormalities in the microstructure of a mucosal surface can be accurately identified.

In addition, according to the third embodiment, a spatial frequency component which is used for identifying abnormalities in microstructure is specified based on a representative imaging distance to a mucous membrane in an examination region. Thus, the identification accuracy of abnormalities in microstructure can be further improved.

The image processing apparatuses according to the above-described first to third embodiments and modified examples thereof can be implemented by executing an image processing program recorded in a recording medium, on a computer system such as a personal computer or a workstation. In addition, such a computer system may be used by being connected to a device such as another computer system or a server, through a local area network or a wide area network (LAN/WAN) or a public line such as the Internet. In this case, the image processing apparatuses according to the first to third embodiments may acquire image data of an intraluminal image through these networks, or output image processing results to various output devices (a viewer, a printer, etc.) connected thereto through these networks, or store image processing results in a storage apparatus (a recording medium and a reading apparatus for the recording medium, etc.) connected thereto through these networks.

According to some embodiments, examination regions are set so as not to include contour edge regions of an examination target, and abnormalities in microstructure are identified for the set examination regions. Thus, even when the contour edges of the examination target are present in an image, abnormalities in the microstructure on a surface of the examination target can be accurately identified.

Note that the present invention is not limited to the first to third embodiments and the modified examples thereof, and by combining a plurality of components disclosed in the embodiments and the modified examples as appropriate, various inventions can be made. For example, an invention may be made by eliminating some components from all components described in each embodiment or modified example, or an invention may be made by combining together components described in different embodiments or modified examples, as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing an image obtained by capturing inside of a lumen of a living body, the image processing apparatus comprising:
   a processor comprising hardware, wherein the processor is configured to:
      perform a contour edge region extracting process comprising extracting a contour edge region of an examination target from the image;
      perform an examination region setting process comprising setting an examination region in the image so as not to include the contour edge region; and
      perform an abnormal structure identifying process comprising identifying whether a microstructure of a surface of the examination target is abnormal, based on texture information of the examination region, wherein the examination region setting process comprises:
  performing a candidate region setting process comprising setting examination candidate regions in the image; and
  performing a region determining process comprising determining the examination region from the examination candidate regions, based on information on the contour edge region, and
wherein the region determining process comprises:
  performing a contour edge region eliminating process comprising eliminating the contour edge region present in the examination candidate regions; and
  determining, as the examination region, an examination candidate region that remains after the contour edge region is eliminated by the contour edge region eliminating process.

2. The image processing apparatus according to claim 1, wherein the candidate region setting process comprises:
  performing a representative-imaging-distance computing process comprising computing a representative imaging distance to the examination target at a position where each of the examination candidate regions is to be set, and
wherein the candidate region setting process comprises setting the examination candidate regions each having a size according to the representative imaging distance.

3. The image processing apparatus according to claim 1, wherein the candidate region setting process comprises:
  performing a representative-imaging-distance-gradient computing process comprising computing a representative imaging distance gradient of the examination target at a position where each of the examination candidate regions is to be set, and
wherein the candidate region setting process comprises setting the examination candidate regions each having a size according to the representative imaging distance gradient.

4. The image processing apparatus according to claim 1, wherein the examination region setting process comprises:
  performing a distance transform image computing process comprising computing a distance transform image where a distance between each pixel in the image and the contour edge region or an edge of the image is transformed into a pixel value, and
wherein the examination region setting process comprises setting the examination region based on the distance transform image.

5. The image processing apparatus according to claim 4, wherein the examination region setting process comprises setting the examination region such that a pixel whose pixel value is a maximum value in the distance transform image is at a center of the examination region and a distance from the center to a boundary of the examination region is smaller than a distance corresponding to the maximum value.

6. The image processing apparatus according to claim 1, wherein the processor is further configured to:
  perform a repetition process comprising repeatedly performing, on regions where the examination region has not been set, the examination region setting process.

7. The image processing apparatus according to claim 6, wherein the repetition process comprises changing contents of the examination region setting process, according to repetition of the examination region setting process.

8. The image processing apparatus according to claim 1, wherein the contour edge region extracting process comprises:
  performing an edge strength computing process comprising computing an edge strength of each pixel in the image;
  performing a contour edge candidate region extracting process comprising extracting, as a contour edge candidate region, a pixel with the edge strength greater than or equal to a predetermined threshold value; and
  performing a contour edge region specifying process comprising specifying the contour edge region, based on feature data of the contour edge candidate region.

9. The image processing apparatus according to claim 1, wherein the image includes a plurality of wavelength components corresponding to a plurality of colors,
wherein the contour edge region extracting process comprises:
  performing a low-absorption wavelength selecting process comprising selecting a low-absorption wavelength component among the plurality of wavelength components, the low-absorption wavelength component being a wavelength component with a lowest degree of absorption or scattering in the living body, and
wherein the contour edge region extracting process comprises extracting the contour edge region based on the low-absorption wavelength component.

10. The image processing apparatus according to claim 1, wherein the abnormal structure identifying process comprises:
  performing a specific frequency component computing process comprising computing a specific spatial frequency component in the examination region; and
  performing a statistical classification process comprising performing statistical classification based on the specific spatial frequency component.

11. The image processing apparatus according to claim 10, wherein the image includes a plurality of wavelength components corresponding to a plurality of colors, and
wherein the abnormal structure identifying process comprises:
  performing a specific wavelength component selecting process comprising selecting a specific wavelength component from the plurality of wavelength components, the specific wavelength component being specified according to a degree of absorption or scattering in the living body.

12. The image processing apparatus according to claim 10, wherein the image includes a plurality of wavelength components corresponding to a plurality of colors, and
wherein the abnormal structure identifying process comprises:
  performing a ratio-between-specific-wavelengths computing process comprising computing a ratio between wavelength components having different degrees of absorption or scattering in the living body.

13. The image processing apparatus according to claim 10,
wherein the abnormal structure identifying process comprises:
performing a representative-imaging-distance acquiring process comprising acquiring a representative imaging distance to the examination target in the examination region, and
wherein the specific frequency component computing process comprises computing the specific spatial frequency component specified according to the representative imaging distance.

14. The image processing apparatus according to claim 1, wherein the processor is further configured to perform:
a non-examination target region eliminating process comprising eliminating a non-examination target region included in the image from setting of the examination region.

15. The image processing apparatus according to claim 14,
wherein the non-examination target region is a region where one of a dark part, a bright part, a residue, and a bubble is present.

16. An image processing method executed by a processor comprising hardware for processing an image obtained by capturing inside of a lumen of a living body, the image processing method comprising:
a contour edge region extracting step of extracting a contour edge region of an examination target from the image;
an examination region setting step of setting an examination region in the image so as not to include the contour edge region; and
an abnormal structure identifying step of identifying whether a microstructure of a surface of the examination target is abnormal, based on texture information of the examination region,
wherein the examination region setting step comprises:
a candidate region setting step of setting examination candidate regions in the image; and
a region determining step of determining the examination region from the examination candidate regions, based on information on the contour edge region, and
wherein the region determining step comprises:
a contour edge region eliminating step comprising eliminating the contour edge region present in the examination candidate regions; and
determining, as the examination region, an examination candidate region that remains after the contour edge region is eliminated by the contour edge region eliminating step.

17. A non-transitory computer-readable recording medium with an executable program stored thereon, the program instructing a processor comprising hardware for processing an image obtained by capturing inside of a lumen of a living body, to execute:
a contour edge region extracting step of extracting a contour edge region of an examination target from the image;
an examination region setting step of setting an examination region in the image so as not to include the contour edge region; and
an abnormal structure identifying step of identifying whether a microstructure of a surface of the examination target is abnormal, based on texture information of the examination region,
wherein the examination region setting step comprises:
a candidate region setting step of setting examination candidate regions in the image; and
a region determining step of determining the examination region from the examination candidate regions, based on information on the contour edge region, and
wherein the region determining step comprises:
a contour edge region eliminating step comprising eliminating the contour edge region present in the examination candidate regions; and
determining, as the examination region, an examination candidate region that remains after the contour edge region is eliminated by the contour edge region eliminating step.

* * * * *